United States Patent
Light

(10) Patent No.: US 12,405,594 B2
(45) Date of Patent: Sep. 2, 2025

(54) PUMPING OF LIQUID CRYOGEN FROM A STORAGE TANK

(71) Applicant: L'Air Liquide, Societe Anonyme pour l'Etude et l'Exploitation des Procedes Georges Claude, Paris (FR)

(72) Inventor: Joshua Light, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 898 days.

(21) Appl. No.: 17/465,103

(22) Filed: Sep. 2, 2021

(65) Prior Publication Data
US 2023/0067726 A1    Mar. 2, 2023

(51) Int. Cl.
| | | |
|---|---|---|
| *F17C 13/00* | (2006.01) | |
| *B01F 23/00* | (2022.01) | |
| *F04B 37/08* | (2006.01) | |
| *F17C 13/02* | (2006.01) | |
| *G05B 19/4155* | (2006.01) | |

(Continued)

(52) U.S. Cl.
CPC ........ *G05B 19/4155* (2013.01); *B01F 23/042* (2022.01); *F04B 37/08* (2013.01); *F17C 13/025* (2013.01); *F17C 13/00* (2013.01); *F17C 13/04* (2013.01); *F17C 2201/00* (2013.01); *F17C 2205/035* (2013.01); *F17C 2221/012* (2013.01); *F17C 2223/0161* (2013.01); *F25J 3/02* (2013.01); *G05B 2219/49215* (2013.01); *Y02E 60/34* (2013.01)

(58) Field of Classification Search
CPC .. F17C 13/025; F17C 9/02; F17C 9/04; F17C 2227/036; F17C 2227/0358; F17C 2223/0169; F17C 2221/012; F17C 2250/043; F17C 2250/0434; F17C 2250/0626

See application file for complete search history.

(56) References Cited

U.S. PATENT DOCUMENTS

| | | | |
|---|---|---|---|
| 2,657,541 A | | 11/1953 | Schilling |
| 3,371,497 A | * | 3/1968 | Singleton .............. F17C 13/025 62/46.1 |
| 6,000,226 A | | 12/1999 | Lee et al. |

(Continued)

FOREIGN PATENT DOCUMENTS

| | | |
|---|---|---|
| EP | 2 175 187 | 4/2010 |
| EP | 3 218 639 | 5/2021 |
| FR | 3 006 742 | 12/2014 |

OTHER PUBLICATIONS

International Search Report and Written Opinion for PCT/US2022/042315, mailed Dec. 15, 2022.

*Primary Examiner* — Brian M King
(74) *Attorney, Agent, or Firm* — Justin K. Murray

(57) ABSTRACT

A liquid cryogen stored in a liquid cryogen space of a closed insulated cryogenic storage vessel is subcooled by allowing it to enter into a conduit disposed in the liquid cryogen space where it is expanded by a pressure reducer in the conduit, thereby producing a cooled biphasic mixture of the cryogen in liquid and vaporized forms. The cooled biphasic mixture has a temperature lower than that of the liquid cryogen in the liquid cryogen space. Heat is transferred across the conduit from the liquid cryogen in the liquid cryogen space to the cooled biphasic mixture.

35 Claims, 20 Drawing Sheets

(51) Int. Cl.
*F17C 13/04* (2006.01)
*F25J 3/02* (2006.01)

(56) References Cited

U.S. PATENT DOCUMENTS

| | | | |
|---|---|---|---|
| 6,220,037 B1 | 4/2001 | Heilman | |
| 6,782,339 B2 * | 8/2004 | Neeser | F17C 13/028 |
| | | | 702/156 |
| 7,131,278 B2 * | 11/2006 | Svensson | F17C 13/026 |
| | | | 62/50.1 |
| 8,291,944 B2 * | 10/2012 | Allidieres | F17C 5/007 |
| | | | 62/50.7 |
| 11,649,156 B2 * | 5/2023 | Stager | B67D 7/80 |
| | | | 222/146.6 |
| 2012/0159970 A1 * | 6/2012 | Reese | F17C 5/007 |
| | | | 62/53.2 |
| 2016/0215930 A1 * | 7/2016 | Nelson | B63B 25/16 |
| 2020/0182408 A1 * | 6/2020 | Nagura | B67D 7/80 |
| 2021/0404604 A1 * | 12/2021 | Drube | F17C 7/04 |

* cited by examiner

PUMPING OF LIQUID CRYOGEN FROM A STORAGE TANK

CROSS-REFERENCE TO RELATED APPLICATIONS

None.

BACKGROUND

Field of the Invention

The present invention relates to pumping of liquid cryogen from a storage tank. More particularly, it relates to decreasing boil-off losses in the pump by subcooling the liquid cryogen in the storage tank.

Related Art

A cryogenic liquid is defined by Publication C-7 of the Compressed Gas Association Publication as a refrigerated liquid gas having a boiling point of −90 C at 14.7 psia. As such, they are typically stored in insulated vessels at relatively low temperatures. While liquid cryogens are typically stored at super-atmospheric pressures, ordinarily their pressures are orders of magnitude lower than the pressure of the cryogen stored in gaseous form. Typical cryogens used industrially include hydrogen, nitrogen, oxygen, argon, xenon, krypton, and carbon dioxide.

One technology for supplying liquid cryogens, such as liquid hydrogen ($LH_2$) (especially for hydrogen energy) is the pumping of the liquid cryogen to high pressures. For smaller, non-hydrogen energy end use applications, $LH_2$ pumps have typically been used to reach pressures up to 3,000 psig (206.8 bar). For the hydrogen energy market, higher pressures are typically encountered for various applications: medium-pressure applications and high-pressure applications. Medium-pressure applications, such as filling gaseous hydrogen distribution trailers, forklifts, or busses, require hydrogen at pressures of around 6,000 psi (413.7 bar). High-pressure applications, such as filling light duty or heavy duty vehicles, require hydrogen at pressure of around 12,000 psig (827.4 bar).

Cryogenic piston pumps of various sizes, orientations, and mechanical drives are available and are produced by several companies. For these pumps, the basic design of a single stage cryogenic pump cylinder is similar. While pumping hydrogen to medium and high pressures, these single stage pumps have relatively poor volumetric efficiency and yield in comparison to the same pumping of liquid nitrogen or other liquefied industrial gases.

In the case of LH2, most medium-pressure LH2 pumping sites include a LH2 vessel with an operating pressure of 150 psig (10.3 bar), a pump or pumps, a compressor, and other equipment for the distribution of the pressurized hydrogen to its end use. The LH2 vessel receives its hydrogen from LH2 transports.

Regardless of the specific type of liquid cryogen but especially for LH2, for medium pressure pumping sites, the main factors that impact the performance of a pump include the number of running hours on the cold end, the presence of proper cooling of the cold end cylinder, the discharge pressure of the pump, and the net positive suction head available ($NPSH_A$). The $NPSH_A$ is the net positive suction head available at the pump inlet.

While the pumping of all cryogenic liquids presents many challenges that are not otherwise encountered with non-cryogenic liquids, because of its physical properties, liquid hydrogen is even more difficult to pump than other cryogenic liquids. Hydrogen has a low viscosity especially gaseous hydrogen. It has a very low boiling point (i.e., more than 100° F.) colder than oxygen, nitrogen and argon, so any heat addition may create gaseous hydrogen. During the pumping of liquid hydrogen, once the hydrogen begins to slip past the piston rings of the pump, the rings tend to progressively align, thereby allowing a more direct path for the hydrogen past them. This leads to increased hydrogen boiloff and less efficient pumping. Hydrogen's low critical pressure limits the ability to subcool LH2 using artificial head pressure. The density of LH2 rapidly decreases (e.g., ~40% over 150 psi) as the saturation pressure increases in alignment with the low critical pressure. While helium also has a very low boiling point, hydrogen is more different to pump in comparison. Helium has a much higher viscosity. Because helium has a very low latent heat of vaporization in comparison to hydrogen, applications necessitating that liquid helium be pumped are very rare.

For liquid cryogen pumping, especially hydrogen, an appropriate $NPSH_A$ is critical. For the typical single stage cryogenic pump discharging to medium pressure (of around 6,000 psig or 413.7 bar), the appropriate $NPSH_A$ is approximately 25 psi (1.7 bar) for a vessel having a pressure that is 25 psi higher than the hydrogen vapor pressure. With the appropriate amount of $NPSH_A$ the pump will run as designed and minimal vapor will be present during the pump stroke. As the $NPSH_A$ decreases, the liquid cryogen will vaporize more easily when heat is added or when the pressure decreases (e.g., during the micro steps of the pumping process such as the liquid cryogen flowing across the suction valve). This vapor is detrimental to pumping because the vapor flows past the piston rings more readily than liquid and pumping gaseous cryogen adds heat to the system from compression of the gas. This increase in heat causes more liquid cryogen to vaporize as it is introduced into the pumping cylinder. The vapor returned will increase the vessel pressure and add to the $NPSH_A$. However, if the vessel was already at its maximum operating pressure before more vapor is returned due to the addition of compression heating the system, vapor will be vented from the ullage of the vessel in order to avoid its pressure exceeding the maximum operating pressure. Once the $NPSH_A$ is insufficient, the conditions in the system deteriorate quickly because the vessel pressure cannot increase further and heat is added to the LH2 at an even more increased rate creating a situation that accelerates the decrease in $NPSH_A$. Those skilled in the art will recognize that this situation requires significant venting of the ullage of the vessel, and therefore, losses of hydrogen.

$$NPSH_A = H_A - H_{VP}$$

where, $NPSH_A$=net positive suction head available (psi)
$H_A$=surface pressure in the vessel (psig)
$H_{VP}$=vapor pressure of the liquid (psig)

Because the vapor pressure of the liquid ($H_{VP}$) and the pressure in the vessel ($H_A$) are often expressed in units of psig, the $NPSH_A$ for liquid hydrogen will be expressed in units of psi. The vapor pressure ($H_{VP}$) of liquid hydrogen is rarely known because of the lack of data from highly accurate temperature sensors. Without proper vapor pressure ($H_{VP}$) information, the actual $NPSH_A$ that is necessary to avoid cavitation in a liquid hydrogen pump may not been determined.

Reaching a proper $NPSH_A$ is challenging for applications involving the pumping of liquid cryogens, especially hydrogen, because of the pressure rating of the vessel limits the amount of pressure at the surface in the level (e.g., $H_A$) and the continuous heat input into the system increases the vapor pressure of the liquid (e.g., $H_{VP}$). In the case of hydrogen, LH2 vessels are limited to a pressure rating of 150 psig because the pressure safety valves, which fully open at 165 psig (11.4 barg)—corresponding to 110% of maximum allowable working pressure (MAWP))—are not designed for supercritical fluids as the critical pressure of hydrogen is 174 psig (12.0 barg). In order to prevent operation of the spring operated pressure safety valve, the maximum operating pressure is maintained at 135 psig (10% below PSV set point). As described above, one way of creating $NPSH_A$ is by having a head pressure that is greater than the vapor pressure of the liquid. With the limitation of the maximum operating pressure of the vessel in mind, the skilled artisan will recognize that there is a fixed amount of head pressure that can be added to the system.

The other factor making it difficult to maintain $NPSH_A$ in a liquid cryogen system is the continuous heat input to the system. Advanced approaches to insulation (i.e., super insulation) limit the heat input from natural heat leak to very low values, but a significant amount of heat can still be introduced from the pump, such as during cool-down and also operation of the pump. Much of this heat is absorbed into the liquid cryogen which increases the vapor pressure ($H_{VP}$).

Minimizing the heat content of the original delivery is critical in order to prolong the period of time during which appropriate $NPSH_A$ (e.g., vessel pressure LH2 vapor pressure+25 psi) is still attainable. When the original vapor pressure is low, the appropriate $NPSH_A$ can be maintained for several days before the vessel pressure reaches the maximum operating limit. Ideally the vapor pressure of the delivered liquid cryogen should be as low as possible, which is typically in the range of 10-20 psig (0.69 barg) vapor pressure. If the delivery to a cryogenic liquid pumping site is not the first delivery from the liquid cryogen transport (i.e., tanker), the initial heat content from the transport is much greater than desired.

As the value of cold hydrogen has been noticed, major customers are requesting the LH2 to be delivered with a minimum temperature, minimum vapor pressure, minimum heat content, and maximum density. In many instances, industrial gas companies producing liquid hydrogen can deliver LH2 that is very cold (e.g., a saturation pressure of ~20 psig) or very hot (e.g., a saturation pressure of 40-50 psig). The existing industrial cryogenic supply chain has not historically quantified this aspect of the product, and meeting the customers' request presents a major challenge. There are several technologies and techniques being evaluated to minimize the heat input throughout the supply chain.

While the typical processes for delivering many different types of liquid cryogens are similar, the typical process for delivering industrial LHS is performed in the following manner. First, the receiving vessel is vented so that the pressure in the vessel is approximately 120 psig (8.23 barg) or less. Then the transport pressure is initially increased to 15 psi (1.03 bar) above the receiving vessel pressure. Throughout the transfer of LH2 from the transport to the receiving vessel, the pressure in the receiving vessel will decrease, and the pressure in the transport must be maintained at 15-30 psi (1.03-2.06 bar) above the pressure of the receiving vessel. After the transfer, the pressure in the headspace of the transport is at an elevated pressure (depending upon delivery conditions, typically 100-120 psig or 6.90-8.28 barg) and the LH2 inside the transport is sloshed in order to collapse (i.e., decrease) the pressure in the head space. This new, lower pressure allows compliance of the trailer for road transport. The same process occurs at subsequent deliveries. After the final delivery, there is an insufficient amount of LH2 in the transport to be collapse the pressure via sloshing, so the pressure in the transport is decreased by venting the gas from the head space. This gas venting, after the final delivery, is often quite substantial and typically results in the loss of 700-900 kg of hydrogen. Therefore, skilled artisans will recognize that there is a need for an improved method and/or apparatus for decreasing or avoiding losses of hydrogen incurred in filling vessels with LH2 from a transport.

With the above-mentioned filling process in mind, operators at sites receiving deliveries of liquid cryogen that are looking to achieve optimal pump performance often request the liquid cryogen provider to provide liquid cryogen with a relatively low heat content. For example, they may request the first delivery of the day from a LH2 transport in order to attain a minimal heat content in the LH2. They will also request a large amount of liquid cryogen to be delivered (in the case of LH2, 900,000-1,000,000 std $ft^3$ (25,485-28,317 std $m^3$ or 2,126-2,362 kg) and that the driver follow procedural steps to minimize heat input to the vessel. When such requests are respected for repeated deliveries, the yield is in the range of 85% to 90% as compared with a normal yield of 65-70%. Yield is the amount of hydrogen filled into the receiving tank/the amount of hydrogen removed from the delivery vessel. All the mass that is removed from the vessel but isn't filled into a receiving tank is vented from the vessel. Satisfying these requests is challenging for the liquid cryogen provider because each of such sites needs a first delivery from the transport.

In addition to receiving the first delivery from a transport, operators have requested the liquid cryogen provider to avoid several behaviors. First, they wish to not receive the last delivery of the transport. The last load of liquid cryogen often has a much higher vapor pressure and vapor temperature than the immediately previous delivery—thus presenting the problems discussed above. Also, the last delivery has a significant amount of losses that are billed to the customer due to the venting after that last delivery in order to decrease the transport pressure to a level compliant with over the road travel. Second, the operator does not want the liquid cryogen to be in the receiving vessel for a lengthy period of time (e.g., no longer than 9-10 days in the case of LH2) without another cold delivery. This is because the becomes saturated after many days in the receiving vessel. Third and in the case of LH2, the vessel should never go below a minimum given capacity (e.g., ~40% of vessel level). Although this level is much higher than the typical refill level for other liquid cryogens, operators have found that the pumps perform poorly once this level in the vessel goes below the minimum. In reality, the liquid is likely saturated once the vessel level has dropped this low, and another cold LH2 delivery is needed to have subcooled LH2.

Deliveries to sites for high-pressure liquid cryogen pumping also have their attendant issues. For example, liquid hydrogen refueling stations (LHRSs) may have requirements for the LH2 vapor pressure, temperature, heat content, and density. Maintaining the heat content is the major constraint for LH2 providers planning distribution of LH2 to the LHRS because it greatly affects the efficiency and losses from delivery.

There are several situations in which LH2 needs to be cooled in order to meet such requirements. First, the LH2 can be relatively warm (i.e., a vapor pressure up to 20 psig or 1.38 barg) when it is stored at the primary production site. In order for the LH2 to be delivered at the customer specification, this LH2 must first be cooled. Second, the LH2 warms when it is contained within the transport for long durations of time regardless of whether the transport is traveling a relatively long distance or is just sitting inactive. Third, there is an amount of LH2 that remains in the transport after deliveries are completed that is too warm for the customers. If the remaining LH2 is to be used for pumping applications, it must first be cooled below the heat content required by the customer.

While a variety of techniques exist for cooling LH2, they have proved to be unsatisfactory for one or more reasons. Once heat is added to the LH2, it is very difficult to remove heat from the LH2.

One way to cool the LH2 is with external refrigeration. For example, Air Liquide Advanced Technologies specializes in extreme cryogenics and offers several superior products for deep cryogenic refrigeration. Unfortunately, extreme cryogenic refrigeration can be fairly energy intensive and requires specialized knowledge and equipment. All of these factors make extreme cryogenic refrigeration cost prohibitive.

Another way to reduce the heat content of LH2 is to lower the pressure in the vessel below the vapor pressure of the LH2. As the pressure in the vessel decreases, the vessel pressure eventually decreases to the point where the vapor pressure of the LH2 is greater than the pressure in the vessel. When this occurs, the LH2 begins boiling, and a large amount of heat is removed (latent heat of vaporization) from the LH2 causing the heat content to decrease and the vapor pressure of the LH2 to decrease until the vapor pressure of the LH2 is equal to the pressure in the vessel. While removing vapor, the $NPSH_A$ of the system is 0 psi because the vessel pressure is equal to the LH2 vapor pressure. With no $NPSH_A$, the pump will run very poorly with a low yield and flow rate. After the cooling is achieved, the pressure in the vessel is increased by vaporizing hydrogen in the pressure building coil. After the pressure is added, the vessel has subcooled LH2 now that the $H_A$ is greater than $H_{VP}$.

In order to remove vapor for evaporative cooling, the gaseous hydrogen can be utilized as the suction for a compressor or vented to the atmosphere. The least wasteful approach is to use a compressor to capture the vapor. Because of the high costs of compressors, some operator of LH2 sites have compressors with flow rates of 2-4 kg/hr. For evaporative cooling of half of the vessel by 30 psi (2.07 bar) will require the compressor to run for approximately 48-120 hours without the pump operating. This is clearly far too long for a pumping site to wait for the evaporative cooling to be completed.

Due to the limited suction pressure of the compressors and the long duration of inoperability of the pump while evaporatively cooling the vessel with a compressor, venting to the atmosphere is often the only practical method for achieving cooling of the LH2. Subcooling the LH2 is costly and avoided unless absolutely necessary because of the amount of hydrogen wasted by venting. Unfortunately, the cooling is often necessary when pumping to high discharge pressures in order to successfully pump to the discharge pressure.

SUMMARY

There is disclosed a liquid cryogen storage apparatus having subcooling capability, that includes: a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and a hollow metal conduit at least partly disposed within the vessel that has an open first end disposed within the liquid cryogen space and a second end that is connected to or extends through the vaporized liquid cryogen outlet. A pressure reducer is disposed either within the conduit or at the first end that is adapted and configured to flash the liquid cryogen entering into the conduit into a biphasic mixture of liquid cryogen and vaporized liquid cryogen. When the vessel is partially filled with a liquid cryogen, an exterior surface of the conduit is in direct contact with the liquid cryogen. The conduit is adapted and configured to transfer heat to the biphasic mixture from the liquid cryogen in the liquid cryogen space and vaporize at least some of the liquid cryogen in the biphasic mixture.

There is also disclosed a hydrogen refueling station for refueling fuel cell electric vehicles with pressurized hydrogen, that includes: one or more of the above-disclosed apparatus; one or more pumps in downstream fluid communication with the one or more apparatus each of which is adapted and configured to receive liquid hydrogen from the one or more apparatus via the liquid cryogen outlet; one or more vaporizers in downstream fluid communication with the one or more pumps that is adapted and configured to vaporize the pumped liquid hydrogen and produce pressurized gaseous hydrogen; one or more high pressure buffer containers in downstream fluid communication with the one or more vaporizers that is adapted and configured to store the pressurized gaseous hydrogen; and one or more nozzles in downstream fluid communication with the one or more vaporizers and one or more high pressure buffer containers that is adapted and configured to be connected in fluid communication with a tank of a fuel cell electric device and dispense the pressurized gaseous hydrogen thereto.

There is also disclosed a method of subcooling a liquid cryogen that includes the following steps. The above-disclosed apparatus is provided, wherein the vessel is storing a cryogen in liquid form. The liquid cryogen in the liquid cryogen space is allowed to enter the conduit and have a pressure thereof be reduced by the pressure reducer, thereby producing a cooled biphasic mixture of the cryogen in liquid and vaporized forms, wherein the cooled biphasic mixture has a temperature lower than that of the liquid cryogen in the liquid cryogen space.

Any one or more of the above-disclosed apparatus, station or method may include one or more of the following aspects:
  the pressure reducer is a fixed orifice or nozzle having a fixed open cross-sectional surface area.
  the pressure reducer is a manually adjustable valve or reducer.
  the pressure reducer is an automatically controlled flow rate control valve or pressure control valve and a programmable logic controller or distributed control system coded with PID control logic that is adapted and configured to control operation of the pressure reducer.
  a differential pressure sensor is adapted and configured to measure a differential pressure between a pressure in the conduit at a position adjacent to, and downstream of, the pressure reducer and a pressure in the conduit at a position within the vessel above a surface of the liquid cryogen or adjacent or at the second end, and the pressure reducer is controlled by the programmable logic controller or distributed control system based upon the measured differential pressure.

a phase separator is disposed in the conduit above a surface of the liquid cryogen space upstream, a level sensor is adapted and configured to measure a level of liquid cryogen in the phase separator, and the pressure reducer is controlled by the programmable logic controller or distributed control system based upon the measured liquid level.

a pressure sensor is adapted and configured to measure a pressure of the vaporized liquid cryogen in the conduit between a position in between a location above a level of the liquid cryogen space within the vessel and a position at or adjacent to the second end, and the pressure reducer is controlled by the programmable logic controller or distributed control system based upon the measured pressure.

a temperature sensor is adapted and configured to measure a temperature of the vaporized liquid cryogen within the conduit or exiting the conduit, and the pressure reducer is controlled by the programmable logic controller or distributed control system based upon the measured temperature.

a portion of the conduit between the first and second ends extends into a vacuum space between adjacent walls of the vessel and the pressure reducer is disposed in the portion of the conduit that extends into the annular vacuum space.

a portion of the conduit between the first and second ends extends out of the vessel and the pressure reducer is disposed in the portion of the conduit that extends out of the vessel.

a low pressure buffer container is in downstream fluid communication with the conduit, the low pressure buffer container has a vaporized liquid cryogen inlet that is adapted and configured to receive the vaporized liquid cryogen from the second end and an end-use outlet and a feed line connected thereto that has a terminal end that is adapted and configured to be connected to an end-use.

a pressure sensor is adapted and configured to measure a pressure of the vaporized liquid cryogen at a location between a position in the conduit at a location within the vessel above a level of the liquid cryogen space and a position at or adjacent to the terminal end and the pressure reducer is controlled by the programmable logic controller or distributed control system based upon the measured pressure.

a temperature sensor is adapted and configured to measure a temperature of the vaporized liquid cryogen at a location between a position in the conduit at a location within the vessel above a level of the liquid cryogen space and a position at or adjacent to the terminal end and the pressure reducer is controlled by the programmable logic controller or distributed control system based upon the measured temperature.

a safety vent comprises a pressure relief valve disposed in a safety vent tube that is in fluid communication with a safety vent outlet disposed in a wall of the vessel and the pressure relief valve being adapted and configured to open when a pressure of the ullage is at or above a predetermined pressure and close when the pressure of the ullage is below a predetermined pressure.

a vent line in downstream fluid communication with the vaporized liquid cryogen outlet, a heat exchanger or heater is adapted and configured to warm the vaporized liquid cryogen received into the vent line, and the vent line being adapted and configured to vent the vaporized liquid cryogen from the vent line and to the atmosphere.

a low pressure buffer container is in downstream fluid communication with the vaporized liquid cryogen outlet and the vent line, the low pressure buffer container has an end-use outlet being adapted and configured to be connected to an end-use of the vaporized liquid cryogen contained therein, and the low pressure buffer container has a volume greater than the conduit and is adapted and configured to reduce pressure variations of the vaporized liquid cryogen exiting the end-use outlet.

a compressor is in downstream fluid communication with the second end that is adapted and configured to compress the vaporized liquid cryogen exiting the vent line, and a feed line adapted and configured to receive the compressed vaporized liquid cryogen and feed the compressed vaporized to the one or more high pressure buffer containers.

a safety vent comprising a pressure relief valve is disposed in a safety vent tube that is in fluid communication with a safety vent outlet disposed in a wall of the vessel, the pressure relief valve being adapted and configured to open when a pressure of the ullage is at or above a predetermined pressure and close when the pressure of the ullage is below a predetermined pressure, wherein the safety vent is in upstream fluid communication with a suction inlet of the compressor.

the pressure reducer is an automatically controlled flow rate control valve or pressure control valve and said station further comprises a programmable logic controller or distributed control system coded with PID control logic that is adapted and configured to control operation of the pressure reducer.

a compressor is in downstream fluid communication with the second end that is adapted and configured to compress the vaporized liquid cryogen exiting the vent line; a feed line is adapted and configured to receive the compressed vaporized liquid cryogen and feed the compressed vaporized to the one or more high pressure buffer containers; and a pressure sensor is adapted and configured to measure a pressure of the vaporized liquid cryogen at a position between a location in the conduit above a level of the liquid cryogen space within the vessel and a position at or adjacent to a suction inlet of the compressor, wherein the pressure reducer is controlled by the programmable logic controller or distributed control system based upon the measured pressure.

a compressor is in downstream fluid communication with the second end that is adapted and configured to compress the vaporized liquid cryogen exiting the vent line; a feed line is adapted and configured to receive the compressed vaporized liquid cryogen and feed the compressed vaporized to the one or more high pressure buffer containers; and a temperature sensor is adapted and configured to measure a temperature of the vaporized liquid cryogen at a position between a location within the conduit above a level of the liquid cryogen space within the vessel or a position at or adjacent to a suction inlet of the compressor, wherein the pressure reducer is controlled by the programmable logic controller or distributed control system based upon the measured temperature.

the pressure reducer is an automatically controlled flow rate control valve or pressure control valve and said method further comprises the steps of: measuring, with a differential pressure sensor, a differential pressure between a pressure in the conduit at a position adjacent to, and downstream of, the pressure reducer and a pressure in the conduit at a position within the vessel above a surface of the liquid cryogen or adjacent or at the second end; and controlling operation of the pressure reducer with a programmable logic controller or distributed control system, coded with PID control logic, based upon the measured differential pressure.

the pressure reducer is an automatically controlled flow rate control valve or pressure control valve, a phase separator is disposed in the conduit above a surface of the liquid cryogen space, and said method further comprises the steps of: measuring, with a level sensor, a level of liquid cryogen in the phase separator; and controlling operation of the pressure reducer with the programmable logic controller or distributed control system based upon the measured liquid level.

the pressure reducer is an automatically controlled flow rate control valve or pressure control valve and said method further comprises the steps of: measuring, with a pressure sensor, a pressure of the vaporized liquid cryogen in the conduit between a position in between a location above a level of the liquid cryogen space within the vessel and a position at or adjacent to the second end; and controlling operation of the pressure reducer with the programmable logic controller or distributed control system based upon the measured pressure.

the pressure reducer is an automatically controlled flow rate control valve or pressure control valve and said method further comprises the steps of: measuring, with a temperature sensor, a temperature of the vaporized liquid cryogen within the conduit or exiting the conduit; and controlling operation of the pressure reducer with the programmable logic controller or distributed control system based upon the measured temperature.

a flow of the vaporized liquid cryogen is allowed from the conduit and into a low pressure buffer container; the vaporized liquid cryogen from the low pressure buffer container is compressed with a compressor in downstream flow communication with the low pressure buffer; and the compressed vaporized liquid cryogen is fed to an end-use from a terminal end of a feed line in fluid communication between the compressor and the end-use.

with a pressure sensor, a pressure of the vaporized liquid cryogen is measured at a location between a position in the conduit at a location within the vessel above a level of the liquid cryogen space and a position at or adjacent to the terminal end; and operation of the pressure reducer is controlled with the programmable logic controller or distributed control system based upon the measured pressure.

with a temperature sensor, a temperature of the vaporized liquid cryogen is measured at a location between a position in the conduit at a location within the vessel above a level of the liquid cryogen space and a position at or adjacent to the terminal end; and operation of the pressure reducer is controlled with the programmable logic controller or distributed control system based upon the measured temperature.

the liquid cryogen is liquid hydrogen.

liquid hydrogen is pumping from vessel; the pumped hydrogen is vaporized in a vaporizer; the vaporized hydrogen is fed to one or more high pressure buffer containers; and the vaporized hydrogen is fed from the one or more high pressure to a tank of a fuel cell electric device via a nozzle in fluid communication between the one or more buffer containers and the fuel cell electric device.

the apparatus is disposed at a liquid cryogen production facility that produces the liquid cryogen that is stored in the vessel and said method further comprises a step of feeding the liquid cryogen from the vessel into a trailer tanker of a liquid cryogen transport vehicle, the liquid cryogen produced by the liquid cryogen production facility being cooled in the vessel before said step of feeding.

the vessel is a trailer tanker of a liquid cryogen transport vehicle and said method further comprises the steps of producing the liquid cryogen, to be stored in the vessel, at a liquid cryogen production facility, feeding the liquid cryogen that is produced by the facility into the trailer tanker, using the liquid cryogen transport vehicle to transport the liquid cryogen fed into the trailer tanker from the facility to an end-user facility that includes a liquid cryogen storage tank, wherein during said step of using, performing said step of allowing.

the vessel is a liquid cryogen storage tank located at an end-user facility and said method further comprises the steps of at least partially filling the vessel with the liquid cryogen from a tanker trailer of a liquid cryogen transport vehicle and using the liquid cryogen stored in the vessel at the end-user facility, said step of allowing being performed after said step of at least partially filling and before said step of using.

the pressure reducer is a controlled flow rate control valve or pressure control valve and said method further comprises the steps of: feeding the liquid cryogen from the liquid cryogen outlet to a pump; pumping the fed liquid cryogen to an end-use; and controlling the pressure reducer and the pump using one or more programmable logic controllers or distributed control systems that is coded with PID control logic, wherein said control of the pressure reducer is performed independent of said control of the pump.

the fed liquid cryogen is pumped from the liquid cryogen outlet to an end-use, wherein said steps of allowing and pumping at least partially overlap in time.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
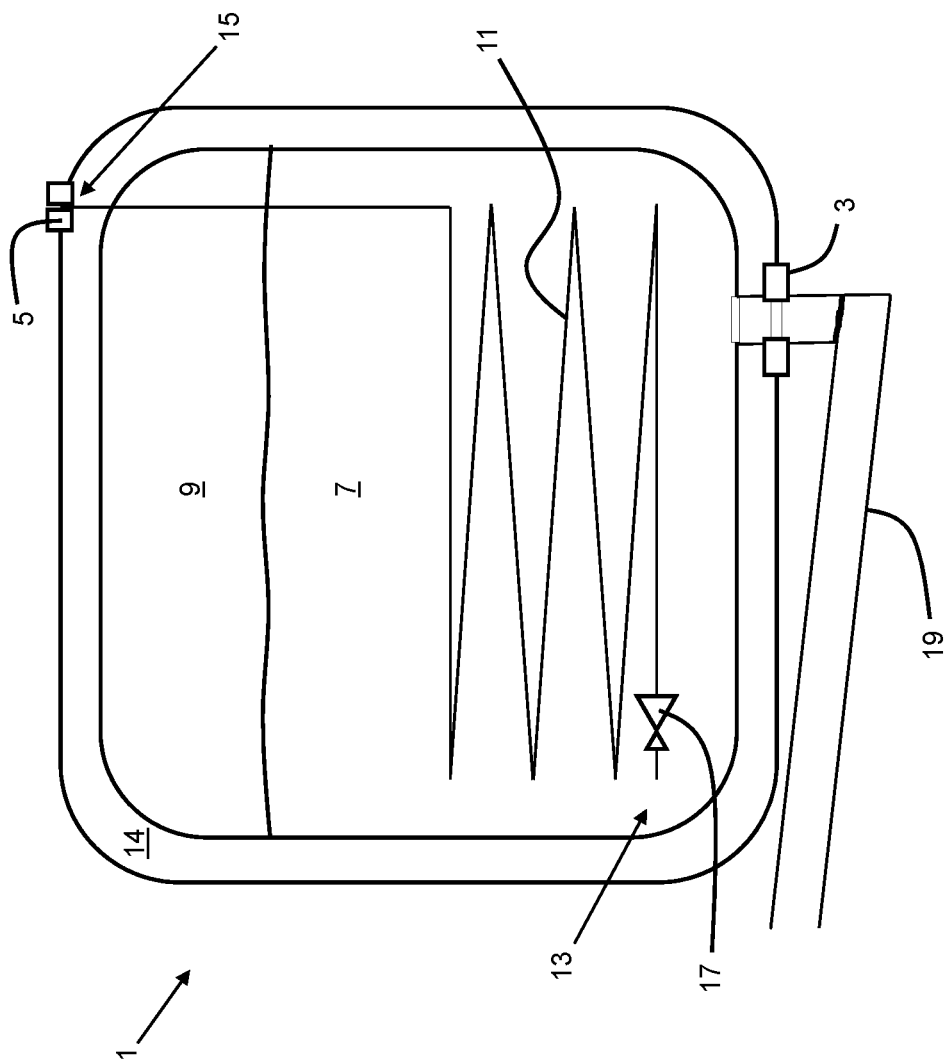
FIG. 1 is a schematic of an embodiment of the invention.

The inventors have invented an improved way of subcooling liquid cryogen without the use of additional refrigeration sources or refrigerants. Amounts of liquid cryogen stored in a sealed, insulated liquid cryogenic storage vessel (hereinafter referred to as the bulk cryogen) are allowed to enter a hollow metal conduit that includes a pressure reducer at or adjacent to a first, upstream end of the conduit. The pressure reducer is adapted and configured to expand (i.e., reduce the pressure of) the bulk cryogen in the conduit, thereby flashing the bulk cryogen into a biphasic mixture of liquid cryogen and vaporized liquid cryogen (or optionally, flashed into wholly gaseous cryogen) and lowering the temperature of the flashed cryogen. The biphasic mixture of liquid and gaseous cryogen (or the wholly gaseous cryogen) resulting from the expansion is hereinafter referred to as the expanded cryogen. Due to the difference in temperature between the bulk cryogen outside the conduit and the expanded cryogen inside the conduit, heat is transferred across the wall of the conduit from the relatively warmer bulk cryogen to the relatively cooler expanded cryogen. In other words, heat from the bulk cryogen is transferred to the expanded cryogen in the form of sensible heat and/or latent heat. If the expanded cryogen contains both liquid and gaseous phases, the transferred heat causes some of the liquid cryogen phase of such a biphasic mixture to vaporize. By setting or controlling the degree to which the pressure of the cryogen is reduced and the rate at which the expanded cryogen exits the conduit, the bulk cryogen within the storage vessel (outside the conduit) can be effectively subcooled so long as the pressure of the expanded cryogen is lower than the saturation pressure of the bulk cryogen.

The expansion can take place isenthalpically by using, for example, an orifice or valve. The expansion can instead take place isentropically using, for example, an expander. Isenthalpic expansion across an orifice or valve will result in a higher proportion of vapor produced and lower amount of available cooling as compared to an isentropic expansion. However, the isenthalpic solution is much simpler to implement. Isentropic expansion with a positive displacement expander (e.g., a sliding vane) or a turbo expander will reduce the vapor portion and increase the amount of cooling available. Due to the simplicity of an isenthalpic expansion device, typically the pressure reducer is one that isenthalpically expands the liquid cryogen.

Depending upon the degree to which the pressure is reduced, this reduction in pressure will of course either result in a biphasic mixture of the cryogen in liquid and gaseous phases or result in an even cooler cryogen that is present in only the gaseous phase. In the case where the pressure of the bulk cryogen is reduced so as to result in biphasic mixture of gaseous and liquid cryogen, the heat from the relatively warmer bulk cryogen outside the conduit will of course be transferred to the relatively cooler biphasic mixture and vaporize amounts of the liquid phase in the biphasic mixture. On the other hand, in the case where the pressure of the bulk cryogen is reduced so as to result in a wholly gaseous phase, the heat from the relatively warmer bulk cryogen located outside the conduit will of course be transferred as sensible heat to the relatively cooler wholly gaseous expanded cryogen inside the conduit until the difference in temperature outside and inside the conduit reaches zero.

Typically, the degree to which the pressure of the liquid cryogen is reduced across the pressure reducing device is set or controlled to result in a biphasic mixture of the cryogen in the liquid and gaseous phases. In this case, heat from the relatively warmer liquid cryogen located outside the conduit is of course transferred as latent heat to the relative cooler biphasic mixture inside the conduit and a portion of the liquid phase inside the conduit vaporizes. Optimally, the degree to which the pressure of the liquid cryogen is reduced across the pressure reducer may be set or controlled so as to achieve two results. First, at the pressure reducer, a biphasic mixture of the cryogen in liquid and gaseous phases is formed. Second, all of the liquid phase in the biphasic mixture is fully vaporized inside the conduit at, or upstream of, the point where the conduit extends outside the liquid cryogen space and into the ullage.

Through use of the pressure reducer as explained above, the liquid cryogen within the vessel may be subcooled. The subcooling may be performed continuously. More typically, the subcooling may be performed non-continuously, especially in response to an indication that the liquid cryogen temperature or vapor pressure is approaching a predetermined set point.

Regardless of the specific approach employed for implementing the invention, one of ordinary skill in the art will recognize that the amount of cooling available will be determined by the reduced pressure in the conduit, the flow rate of the expanded cryogen, and the surface area of the conduit available for heat transfer. Take, for example, a 100 psig saturated liquid hydrogen that is expanded across an orifice to 55 psig. In this scenario, one pound of expanded hydrogen can absorb enough heat from the liquid cryogen outside the conduit to cool down 28 pounds of that liquid cryogen by 1° F. or lower the vapor pressure by 10 psi.

The hollow metal conduit may be configured in any shape desired that allows the first end to be submerged within the liquid cryogen and the second end to reach at least to a vaporized liquid cryogen outlet of the vessel containing the liquid cryogen. Effective heat transfer from the liquid cryogen outside the conduit to the expanded cryogen inside the conduit requires a sufficient heat exchange area. For this reason, a coiled conduit is preferred. However, the use of more elaborate solutions, such as tubing with microchannel aluminum fins, may provide much more surface area in a smaller footprint.

The pressure reducer may be manually or automatically controlled (i.e., automated). An automated or manually controlled pressure reducer may be disposed within the vessel. An automated pressure reducer may instead be disposed within the vessel's annular vacuum space or even outside the vessel in order to facilitate the ease of maintenance, or in the case of a manually controlled pressure reducer, to allow the pressure reducer to be manually controlled. An example of an automated pressure reducer is a flow control valve, an automated expander, or a series of orifices/nozzles including bypass valves. These types of devices are controlled by a programmable logic controller (PLC) or a distributed control system (DCS) coded with PID control logic and are capable of adjusting the pressure reduction or flow rate of the pressure reduction device in order to meet the cooling needs of the bulk cryogen or the needs of the end-user of the bulk cryogen. Automated control devices are preferably located in the annular vacuum space of the vessel or even outside of the vessel.

An example of a manually controlled pressure reduction device is a manual valve or an expander that is not automated. These devices may be manipulated to adjust the pressure drop or flow rate characteristic of the pressure reduction device, but such a device is not controlled with a controller. The manually controlled pressure reduction device can be adjusted so that it satisfactorily meets the needs of the end-user of the bulk cryogen. Similar to automated control devices, manually controlled devices are preferably disposed in the annular vacuum space of the vessel or even outside of the vessel.

The pressure may instead be a fixed device whose operation is not controlled by any control equipment or controlled manually. Those skilled in the art will recognize that if a manual valve is selected for the pressure reducer, such a manual valve constitutes a fixed device if it is not automatically adjusted. Examples of pressure reducers whose operation are not controlled by any control equipment or controlled manually include an orifice or a manual valve.

An example of a fixed pressure reduction device is an orifice or a nozzle. This type of device may be sized in coordination with the end-user of the bulk cryogen in order to supply a pressure drop and/or flow rate that satisfactorily meets the needs of the end-user. As the vessel pressure changes, the pressure drop across a fixed pressure reduction device will remain constant which may limit use of the bulk cryogen by the end-user if the outlet pressure of the subcooling conduit is too low or too high. The fixed pressure reduction device will have to be changed if the desired flow rate or pressure drop changes.

A simpler, lower-maintenance system for performing the invention uses a fixed orifice as the pressure reducer. This device is also known as an orifice plate. An orifice plate is a plate with a hole formed therein that acts as a pressure reduction device. When used in combination with a compressor or vent at, or downstream of, the second end of the conduit, the bulk cryogen may be subcooled simply by turning the compressor on or opening the vent. Given the potential for particles in the bulk cryogen to clog the orifice, an upstream filter may be used. Additionally, from time to time, the flow of expanded cryogen may be reversed through the fixed orifice and filter (if present) to remove any clogging particles.

Alternatively, the conduit can extend beyond the vaporized liquid cryogen outlet and terminate at its downstream, second end at downstream processing equipment. For example, the conduit may feed the expanded cryogen to a heat exchanger if the end-use of the expanded cryogen requires a temperature significantly above that of the expanded cryogen prior to its exit from the conduit. Alternatively, or in addition to a heat exchanger, the conduit may feed the expanded cryogen to a vent for venting the expanded cryogen as desired or necessary. Alternatively, or in addition to either or both of the aforementioned downstream process equipment, the conduit may feed the expanded cryogen to a low pressure buffer vessel having a feed line, a terminal end of which is adapted and configured to be connected to an end-use for the expanded cryogen. Alternatively, or in addition to one or two or even three of the aforementioned downstream processing equipment, the conduit may feed the expanded cryogen to the suction inlet of a compressor. Such a compressor is used to boost the pressure of the expanded cryogen to a pressure that is suitable for its end-use. Alternatively, the second, downstream end of the conduit may terminate at the vaporized liquid cryogen outlet—where the expanded cryogen is received by any one or more of the aforementioned downstream processing equipment.

In the case of hydrogen, if it is not otherwise vented to the atmosphere, the expanded hydrogen may be fed to a compressor for compression to the pressure needed by the end user or to a fuel cell for production of electricity.

If the bulk cryogen is not being sufficiently subcooled, an automated or manually controlled pressure reducer may be controlled in response to a number of different operating parameters. The expanded cryogen in the conduit will remain in liquid phase if it is not absorbing a sufficient amount of heat from the bulk cryogen. Therefore, a differential pressure transmitter can be used to measure a height of liquid in the conduit to determine if it is filled with liquid.

More particularly, a pressure sensor may be used to detect the pressure at downstream of the pressure reducer, such as at its outlet or adjacent to its outlet while another pressure sensor may be used to detect the pressure of the expanded cryogen at a position within the conduit above the liquid cryogen space or downstream of the vaporized liquid cryogen outlet of the vessel (whether in or downstream of the conduit, such as at any downstream processing equipment for downstream processing of the expanded cryogen or at the end-use of the expanded cryogen). For an automated pressure reducer, signals representative of these may be transmitted to a PLC or DCS and the PLC or DCS compares the difference in pressure (i.e., pressure differential) to a pressure differential set point(s) and commands adjustment of the automated pressure reducer accordingly. Alternatively, a differential pressure sensor is utilized for measuring a differential pressure between the aforementioned points and a signal representative of the differential pressure is transmitted to the PLC or DCS and the PLC or DCS commands adjustment of the automated pressure reducer accordingly. Accordingly, the term "differential pressure sensor" (and the like) or "measuring a differential pressure" (and the like) used herein shall mean either measuring two pressures, transmitting signals representative of them to a PLC or DCS which determines the differential pressure or using a differential pressure sensor that measures the differential pressure and transmits a signal representative of the differential pressure to the PLC or DCS.

Alternatively, a phase separator may be disposed in the conduit above a surface of the liquid cryogen space that is equipped with a level sensor that measures a level of liquid cryogen in the phase separator. Similar to the aforementioned control scheme utilizing differential pressure, a signal is transmitted by the level sensor to the PLC or DCS representative of a level of liquid within the phase separator and the PLC or DCS commands adjustment of the automated pressure reducer accordingly.

The automated pressure reducer is used to control the pressure in the conduit according to the desired pressure. At the beginning of using the invention, the liquid saturation pressure may be near the vessel pressure. At this point, the pressure drop needed to create cooling may only need to be ~10 psi. For a compressor receiving the expanded cryogen at a set compression energy, because of the relatively lower pressure drop at the beginning of using the technique invention, a compressor receiving the expanded cryogen would receive a relatively higher flow rate of the expanded cryogen. Because it receives a relatively higher flow rate, more total cooling of the bulk cryogen occurs. As the bulk cryogen cools, the pressure in the conduit needs to be lower than the saturation pressure of the bulk cryogen, so the pressure drop from vessel pressure to this newly desired pressure is different from the original desired pressure. An automated reducer possesses the ability to vary the conduit pressure based on this situation. The conduit can otherwise be monitored for liquid buildup therein or for the temperature of the expanded cryogen exiting the conduit in order to determine if the desired pressure should be higher or lower.

Another way to determine if the subcooling conduit is providing a satisfactory degree of cooling is to measure a temperature of the expanded cryogen. This temperature may be measured at any point in the conduit above the level of the liquid cryogen space, as far downstream as the end-use of the expanded cryogen, or at any point in between, such as at downstream processing equipment. If the measured temperature is at or very slightly above the saturation temperature, then the conduit is absorbing heat from the bulk cryogen. More particular, a signal is transmitted from the temperature sensor to the PLC or DCS that is representative of the measured temperature and the PLC or DCS commands adjustment of the automated pressure controller accordingly.

The system may include the following optional components.

A filter may be provided at or adjacent to the first end of the conduit in order to reduce or prevent the risk of particles in the liquid cryogen being sucked into the conduit and clogging the pressure reducer, especially in the case of an orifice.

A differential pressure transmitter or gauge may be provided in order to determine if heat is being absorbed by the expanded cryogen from the bulk cryogen. The differential pressure transmitter or gauge measures pressure between a location in the conduit at the downstream side of the pressure reducer (or adjacent thereto) and a downstream location in the conduit, such as downstream of where the conduit emerges from the liquid cryogen space within the cryogen storage vessel. If there is a significant amount of liquid cryogen in the conduit, the differential pressure transmitter or gauge will transmit or indicate a relatively high differential pressure ($\Delta P$) level in the conduit. This is an indication that little heat is being transferred from the bulk cryogen to the expanded cryogen and little to no subcooling is taking place. If that is the case, the pressure in the subcooling cool may be reduced in order to provide a greater cooling of the bulk cryogen. If little to no heat is being transferred in the situation where the expanded cryogen is being sucked into the suction inlet of a compressor from, or downstream of, the second end of the conduit, the compressor can be stopped because no benefit is being obtained from its operation. In that case, the expanded cryogen may be vented in order to achieve the desired subcooling result.

For the sake of the safety of any downstream components (e.g., an end-use of the expanded cryogen), a vaporizer may be disposed at, or downstream of, the second end of the conduit in order to warm the relatively cold expanded cryogen to ambient temperatures.

A buffer vessel may be disposed at, or downstream of, the second end of the conduit in order to reduce pulsation of the pressure of the expanded cryogen fed to a compressor or downstream end-use. This is particularly useful for achieving steady state flow rates and pressure differentials at the suction inlet of a compressor or at the end-use when flow rate of the expanded cryogen exiting the conduit varies. Such a stabilized system will also result in more consistent pressure readings, and less data noise, so that control of the system may be more reliably performed by a control system that relies upon such pressure readings.

The portion of the conduit including the pressure reducer may be disposed within the vessel. For ease of maintenance or adjustability of any equipment controlling the pressure reducer, the portion of the conduit including the pressure reducer may instead be disposed in the annular vacuum space of the vessel or even disposed outside of the vessel. Also, a portion of the conduit may extend outside the vessel (regardless of whether the pressure reducer is disposed within the vessel, within the annular vacuum space, or outside of the vessel) may be selected so as to provide a greater cooling effect to a specific location in the delivery path of bulk cryogen from the vessel. For example, a portion of the conduit downstream of the pressure reducer may be located within a feed line extending between the vessel's liquid cryogen outlet and the suction inlet of a cryogenic pump.

As mentioned above, the portion of the conduit in which the pressure reducer is disposed may be located within the annular vacuum space of the vessel or outside the vessel. This allows convenient access to a manually control pressure reducer. Examples of manually controlled pressure reducers include a manual valve whose opening to flow is manually controlled. While an orifice is designed for one pressure drop and flow rate, the opening of a manual valve may be adjusted to achieve various pressure drops and flow rates to suit the requirements of the downstream processing or end-use.

Implementation of the invention is particularly useful for subcooling liquid hydrogen prior to it being pumped. Currently, many hydrogen pumping sites have a compressor due to the large amount of venting from the liquid pump that takes place due to vaporized hydrogen that escapes beyond the liquid seals adjacent to the compressor piston. The suction pressure (which is typically ~110 psig) of such a compressor, unfortunately, is too high for such a compressor to be utilized for subcooling. This is because the pressure differential between the liquid and the expanded cryogen is too low. At pumping sites implementing the invention, a compressor with a lower suction pressure (than those used for venting the liquid pump) could be installed at, or downstream of, the second end of the conduit. For example, a small booster compressor may be used to boost the pressure of the expanded cryogen so that it may be fed to the liquid pump compressor. Typically, such a compressor has a suction pressure at least as low as 70 psig (4.8 barg) and preferably 50-60 psig (3.4-4.1 barg).

There are several advantageous applications of the invention, include but not limiting to the following applications.

The invention may be used at a liquid cryogen production facility prior to the produced liquid cryogen being transported in the trailer tank of a liquid cryogen transport vehicle. The liquid cryogen production facility produces the liquid cryogen that is stored in the vessel. Because the liquid cryogen production facility may produce liquid cryogen at a temperature above that desired for the end-user or because of heat leaks that may be anticipated along the route taken by the liquid cryogen transport vehicle to the end-user, prior to the stored liquid cryogen being fed from the vessel (via pressure and/or gravity and/or pumping) into the trailer tanker, the liquid cryogen is cooled in the vessel according to the invention.

The invention may be used in the trailer tanker of a liquid cryogen transport vehicle. Liquid cryogen is produced at a liquid cryogen production facility. The produced liquid cryogen is fed into the trailer tanker (via pressure and/or gravity and/or pumping) into the trailer tanker. The liquid cryogen transport vehicle transports the liquid cryogen the trailer tanker from the liquid cryogen production facility to an end-user facility that includes a liquid cryogen storage tank. During transportation, the liquid cryogen is cooled in the vessel according to the invention.

The invention may be used in a liquid cryogen storage tank located at an end-user facility. The liquid cryogen storage tank is at least partially filled with the liquid cryogen from a tanker trailer of a liquid cryogen transport vehicle. Before the liquid cryogen is withdrawn from the liquid cryogen storage tank for the end-use, it is cooled therein according to the invention.

Now, I will describe specific embodiments of the invention.

As best shown in FIG. 1, the liquid cryogen storage apparatus of the invention includes a closed insulated cryogenic storage vessel 1 that is adapted and configured to store cryogenic liquids. A liquid cryogen outlet 3 is formed in a wall of the vessel 1 on a bottom thereof or adjacent the bottom of the vessel. A vaporized liquid cryogen outlet 5 is also formed in a wall of the vessel on a top thereof or adjacent the top. The vessel 1 is partially filled with a liquid cryogen so that an interior of the vessel 1 is divided into a liquid cryogen space 7 and an ullage 9 above the liquid cryogen space 7. A feed line 19 is connected to the liquid cryogen outlet 3, forming a fluid-tight seal so that bulk cryogen may be withdrawn from the vessel 1 without allowing a leak of bulk cryogen out of the vessel 1 into the ambient atmosphere.

A hollow metal conduit 11 is disposed within the vessel 1 that has an open first end 13 disposed within the liquid cryogen space 7 and a second end 15 that is connected to the outlet 5, forming a fluid-tight seal so that vaporized cryogen may be withdrawn from the vessel 1 without allowing a leak of gaseous cryogen out of the vessel 1 from the ullage 9. A pressure reducer 17 is disposed within the conduit 11 adjacent the first end 13 (or optionally may be disposed at the first end 13) that is adapted and configured to flash the bulk cryogen entering into the conduit 11 (from the liquid cryogen space 7) into a biphasic mixture of liquid cryogen and vaporized liquid cryogen. As the vessel 1 is partially filled with a liquid cryogen, an exterior surface of the conduit 11 is in direct contact with the bulk cryogen in the liquid cryogen space 7. The conduit 11 is adapted and configured to transfer heat to the biphasic mixture inside the conduit 11 from the bulk cryogen in the liquid cryogen space 7 and vaporize at least some of the liquid cryogen in the biphasic mixture.

Figure 2:
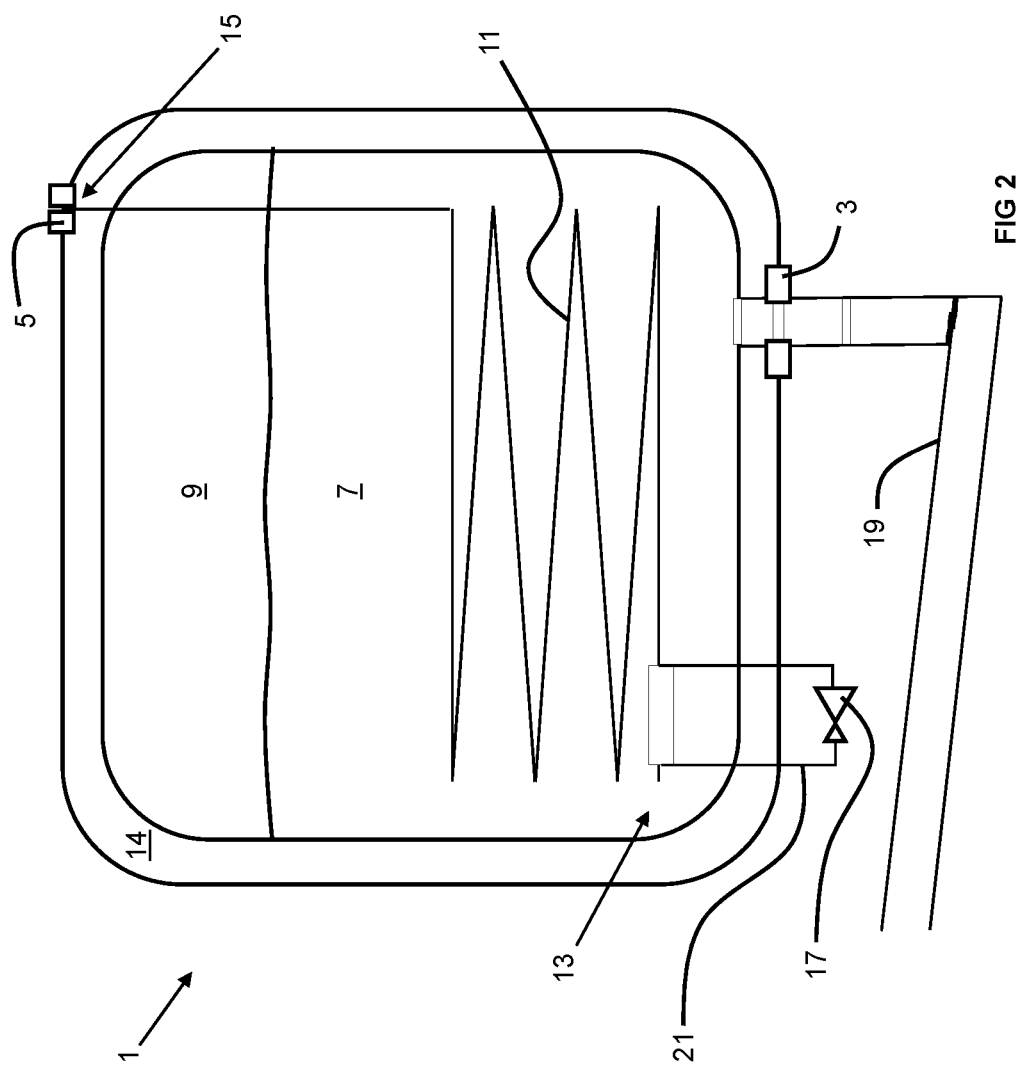
FIG. 2 is a schematic of a variation of the embodiment of FIG. 1 in which the portion of the hollow metal conduit, in which the pressure reducer is disposed, extends outside of the insulated liquid cryogenic storage vessel.

As best illustrated in FIG. 2, the apparatus is similar to that shown in FIG. 1, but only a portion of the conduit 11 is disposed within an interior of the vessel 1. The pressure reducer 17 is disposed in a portion of the conduit 11 that extends outside of and then back into the vessel 1. Such a configuration allows for easier maintenance of the pressure reducer 17, or in the case of a manually-operated one, manual operation of the pressure reducer 17.

Figure 3:
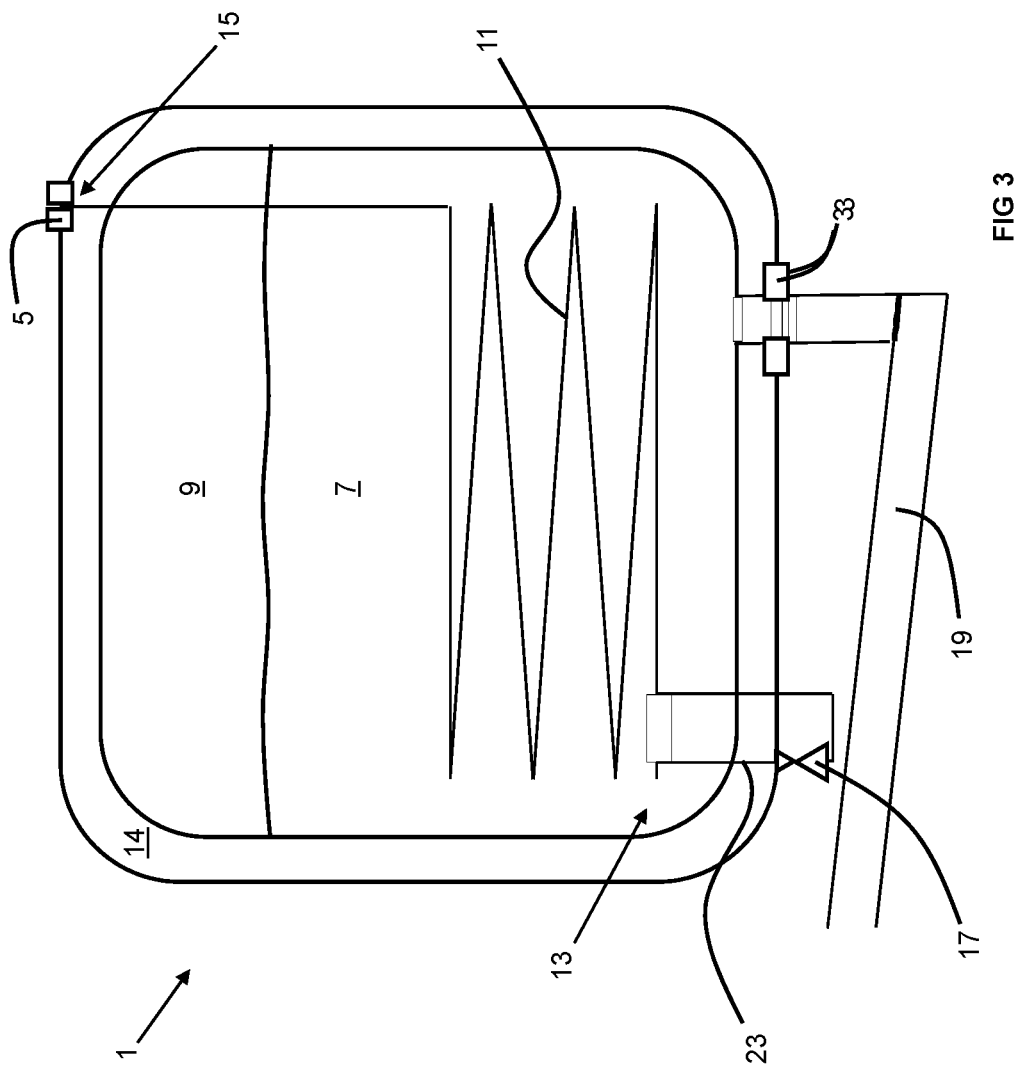
FIG. 3 is a schematic of a variation of the embodiment of FIG. 1 in which the portion of the hollow metal conduit, in which the pressure reducer is disposed, extends inside the annular vacuum space of the insulated liquid cryogenic storage vessel.

As best shown in FIG. 3, the apparatus is similar to that shown in FIGS. 1-2, but instead of a portion of the conduit 11 extending outside of the vessel 1 or an entirety of the conduit extending inside the vessel 1, a portion of the conduit 11 extends into a vacuum space 14 between adjacent walls of the vessel 1. Such a configuration similarly allows for easier maintenance of the pressure reducer 17, or in the case of a manually-operated one, manual operation of the pressure reducer 17.

Figure 4:
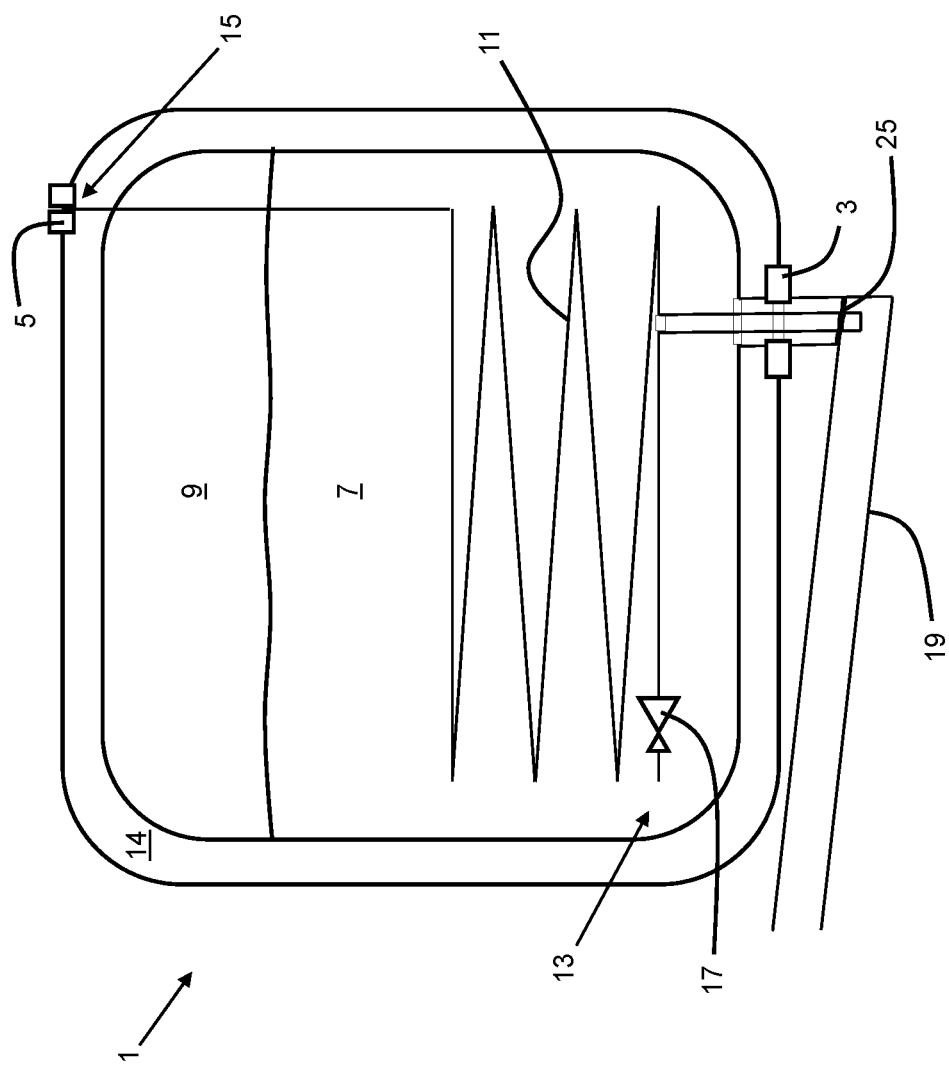
FIG. 4 is a schematic of a variation of the embodiment of FIG. 1 in which a portion of the hollow metal conduit extends into the interior of a feed line leading from the liquid cryogen outlet of the vessel.

As best illustrated in FIG. 4, the apparatus is similar to that shown in FIG. 1, except that a portion of the conduit 11 extends outside of the vessel 1 and into a portion of the feed line 19. In such a configuration, bulk cryogen delivered from the apparatus is more optimally cooled. This is because the temperature of the expanded cryogen is at its lowest just downstream of the pressure reducer 17 and is at its highest at the vaporized liquid cryogen outlet 5 and because the aforementioned portion is nearer to the pressure reducer 17 than it is to the vaporized liquid cryogen outlet 5.

Figure 5:
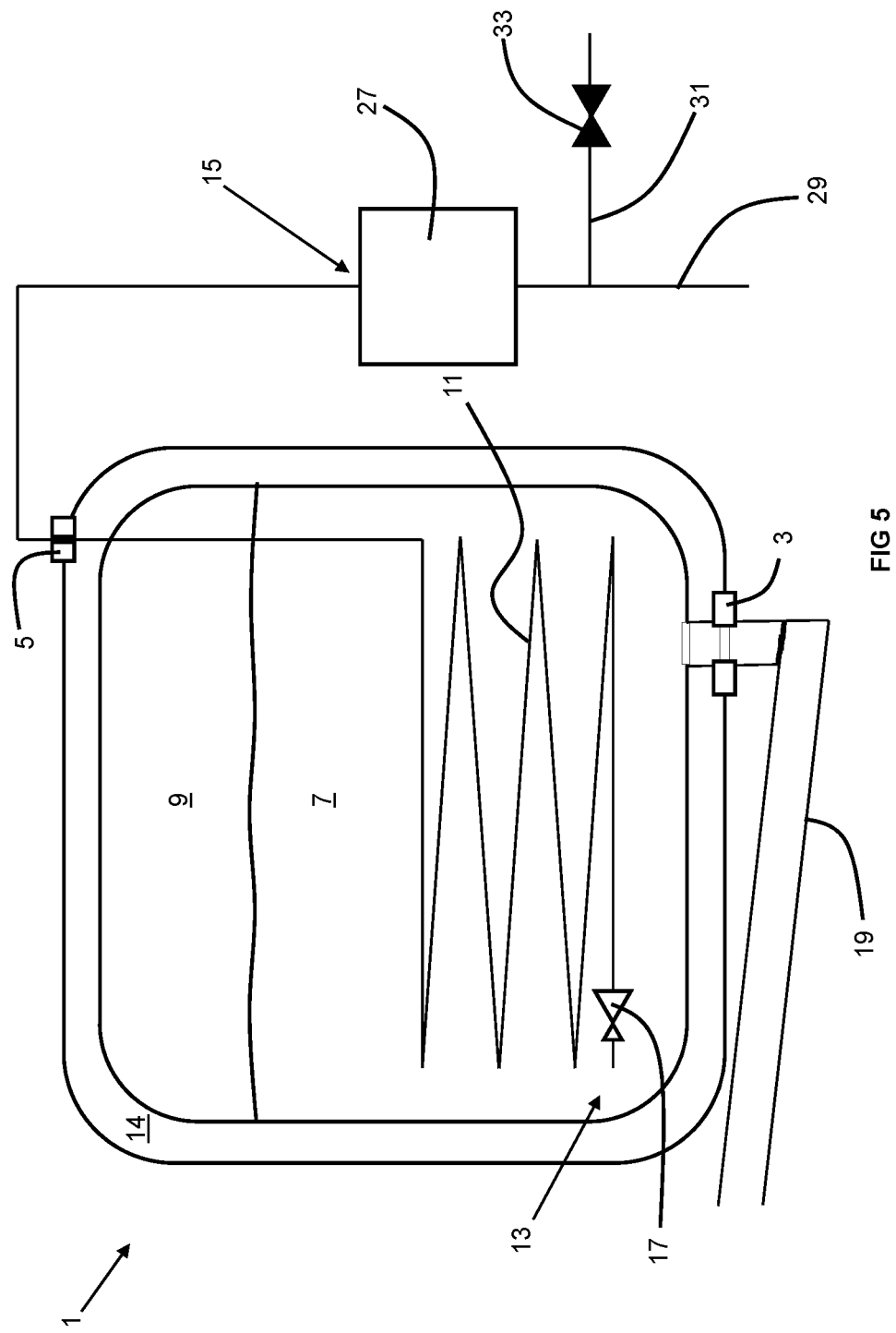
FIG. 5 is a schematic of another embodiment of the invention including vent to atmosphere for the vaporized cryogen.

As best shown in FIG. 5, the apparatus is similar to that shown in FIG. 1 and additionally includes a heat exchanger or heater 27 receiving the expanded cryogen from the second end 15 of the conduit 11. The heat exchanger or heater is adapted and configured to warm the expanded cryogen before it is received by an optional vent line 31 or an optional feed line 29 leading to an end-use. Venting of the expanded cryogen into the atmosphere from the vent line 31 is controlled by a valve 33.

Figure 6:
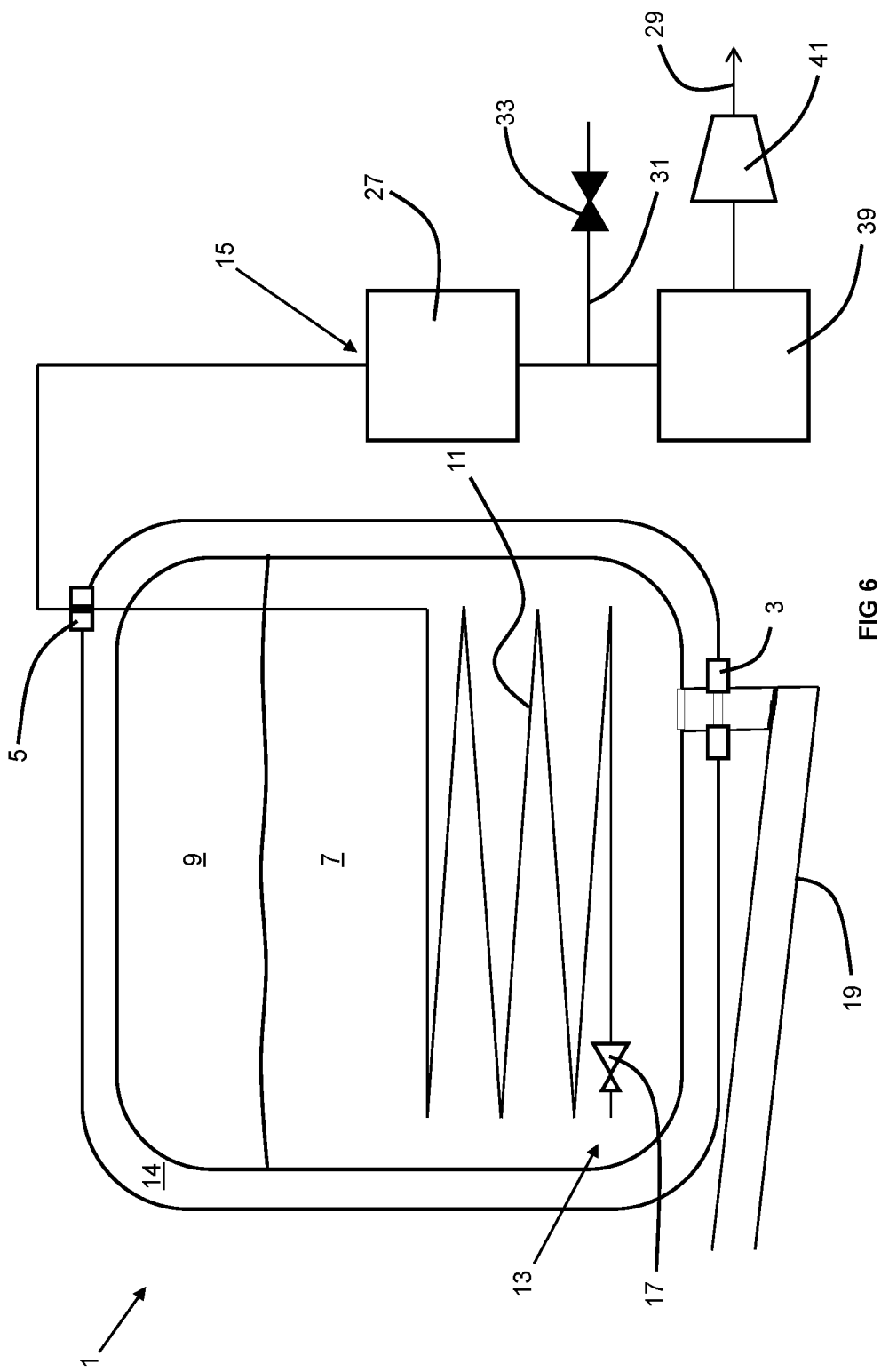
FIG. 6 is a schematic of a variation of the embodiment of FIG. 2, including compression of the vaporized cryogen for feeding it to an end-use.

As best illustrated in FIG. 6, the apparatus is similar to that shown in FIG. 5 and additionally includes an optional low pressure buffer container 39 in downstream fluid communication from an optional heat exchanger or heater 27. The low pressure buffer container includes a vaporized liquid cryogen inlet that is adapted and configured to receive the vaporized liquid cryogen from the second end 15 and an end-use outlet that leads to a compressor 41 and a vaporized liquid cryogen feed line 29 leading to an end-use. The low pressure buffer container has a volume greater than the conduit 11 and is adapted and configured to reduce pressure variations of the vaporized liquid cryogen exiting the end-use outlet. The compressor 41 compresses the vaporized liquid cryogen received from the low pressure buffer container 39. The pressurized vaporized liquid cryogen is received from the compressor 41 and fed into vaporized liquid cryogen feed line 29 that leads to the end-use.

Figure 7:
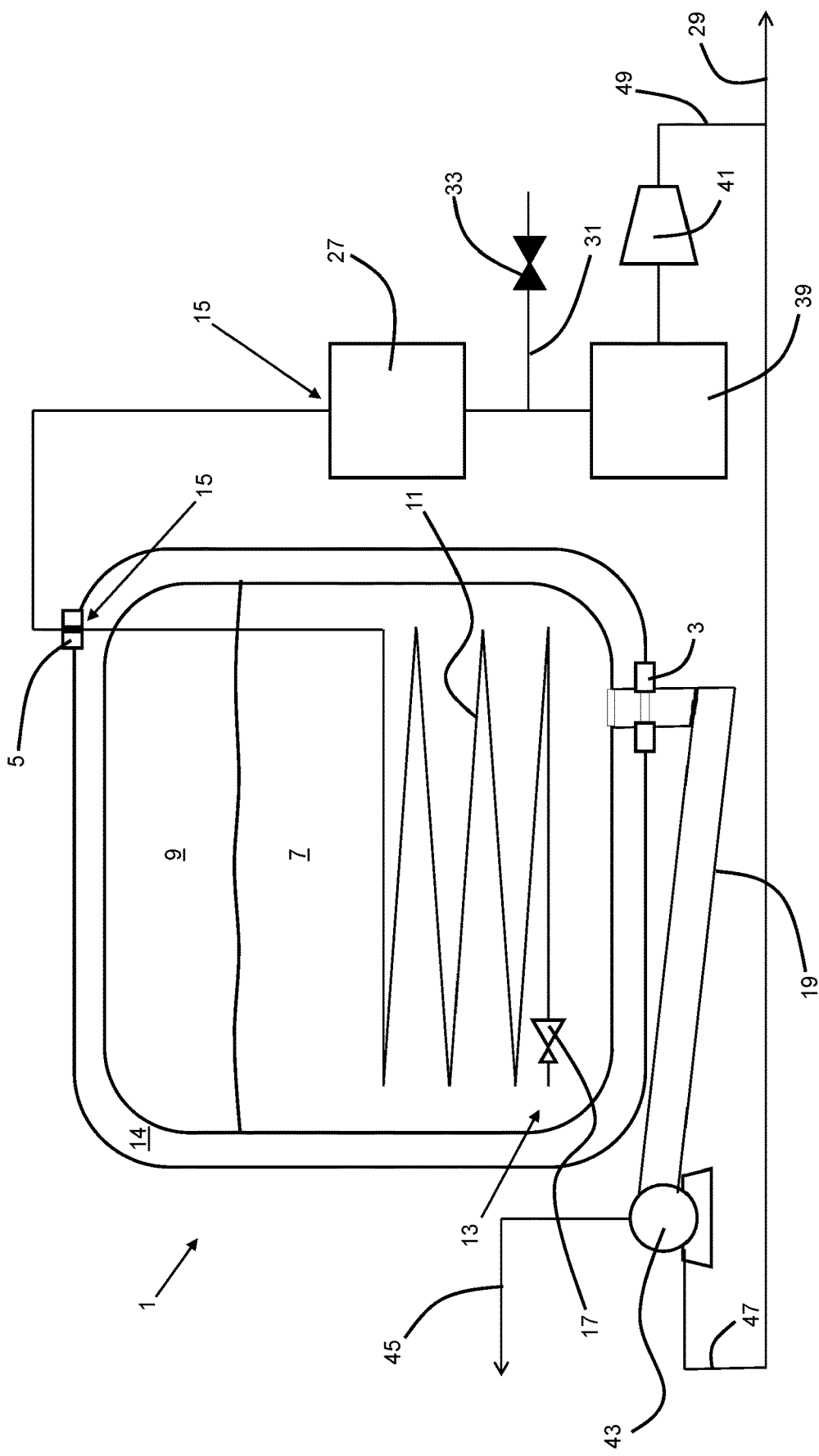
FIG. 7 is a schematic of a variation of the embodiment of FIG. 3, including combining compressed, vaporized cryogen, with vaporized cryogen from a liquid pump fed with the liquid cryogen.

As best shown in FIG. 7, the apparatus is similar to that shown in FIG. 6 and additionally includes a pump 43 that includes a suction inlet that receives bulk cryogen from the feed line 19 and an outlet. The pump 43 pumps the bulk cryogen to a pressure suitable for an end-use of the liquid cryogen via the pump outlet and a liquid cryogen product feed line 45. The pump 43 also includes a vent orifice from which gaseous cryogen (from vaporization of the liquid cryogen inside the pump 43) is fed into a gaseous cryogen vent line 47. The gaseous cryogen is combined with the compressed vaporized liquid cryogen and fed to the end-use via vaporized liquid cryogen feed line 29

Figure 8:
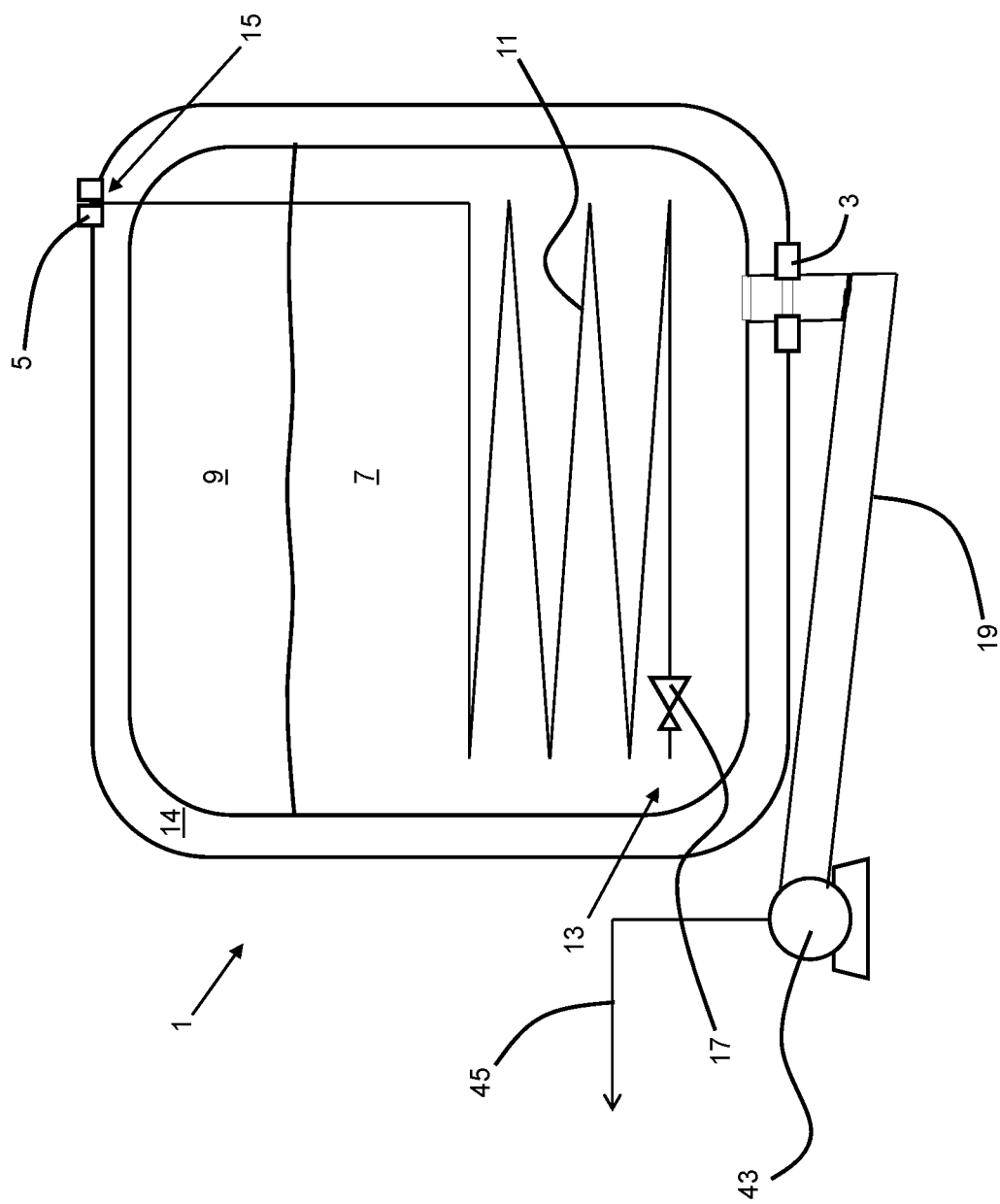
FIG. 8 is a schematic of a variation of the embodiment of FIG. 1, including a liquid cryogen pump.

As best illustrated in FIG. 8, the apparatus is similar to that shown in FIG. 1 and additionally includes a pump 43 that includes a suction inlet that receives bulk cryogen from the feed line 19 and an outlet. The pump 43 pumps the bulk cryogen to a pressure suitable for an end-use of the liquid cryogen via the pump outlet and a liquid cryogen product feed line 45.

Figure 9:
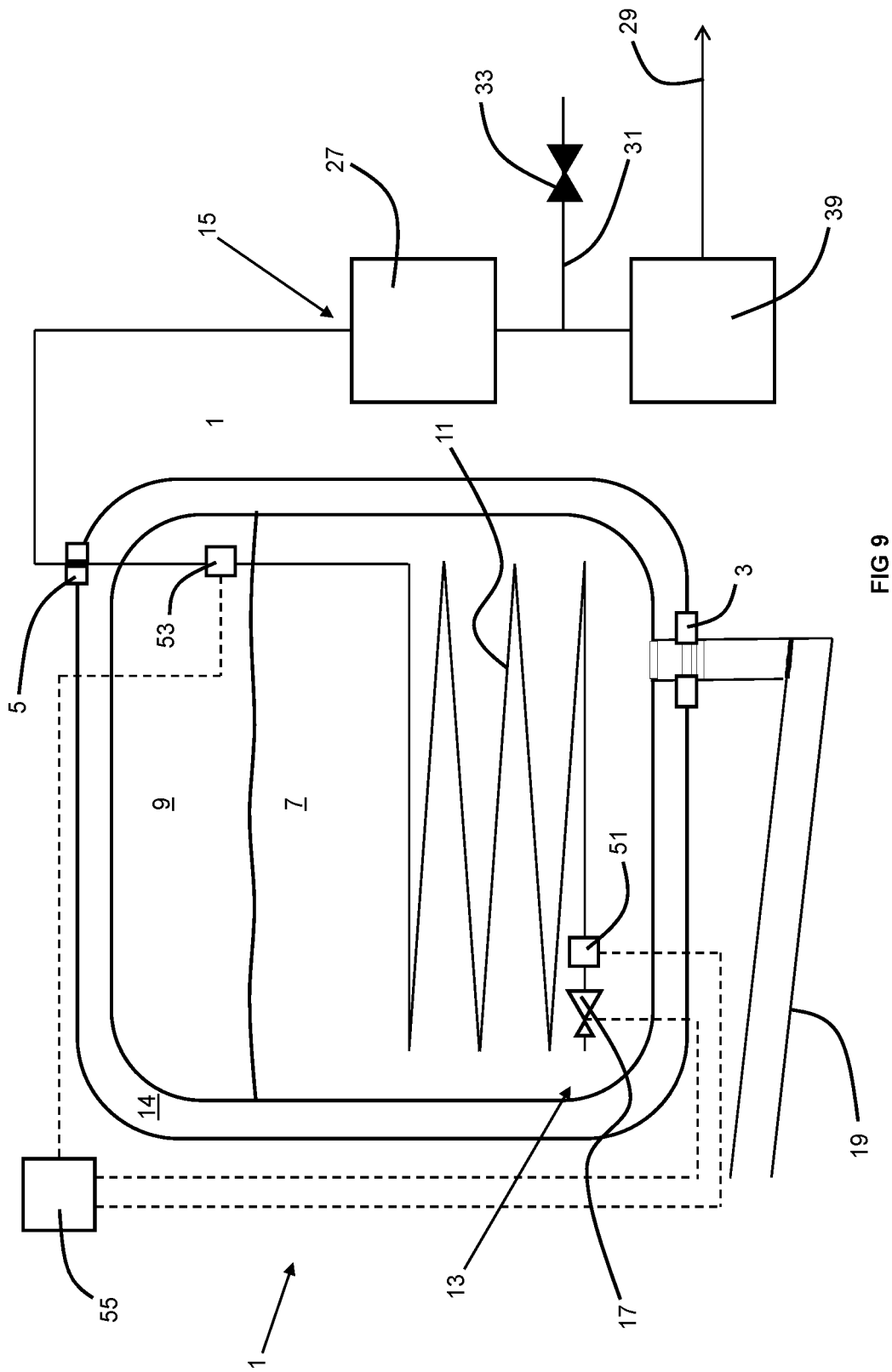
FIG. 9 is a schematic of a variation of the embodiment of FIG. 3, including control of the pressure reducer using a programmable logic controller or distributed control system based upon a difference in pressure at lower and upper positions of the metal conduit.

As best shown in FIG. 9, the apparatus is similar to that shown in FIG. 1 and additionally includes an optional low pressure buffer container 39 in downstream fluid communication from an optional heat exchanger or heater 27 (as described above in the description of FIG. 6), a programmable logic controller (PLC) 55, and pressure sensors 51, 53. Optionally, a distributed control system could be substituted for the PLC. The pressure reducer is a pressure control valve or a flow control valve. The PLC receives a signal from pressure sensor 51 that is representative of a pressure of the expanded cryogen thereat and also a signal from pressure sensor 53 that is representative of a pressure of the expanded cryogen thereat. Based upon the difference between the pressure of the expanded cryogen at sensor 51 and the pressure of the expanded cryogen at sensor 53 (i.e., the differential pressure), the PLC controls operation of the pressure reducer 17 and thus the amount of subcooling of the expanded cryogen.

Figure 10:
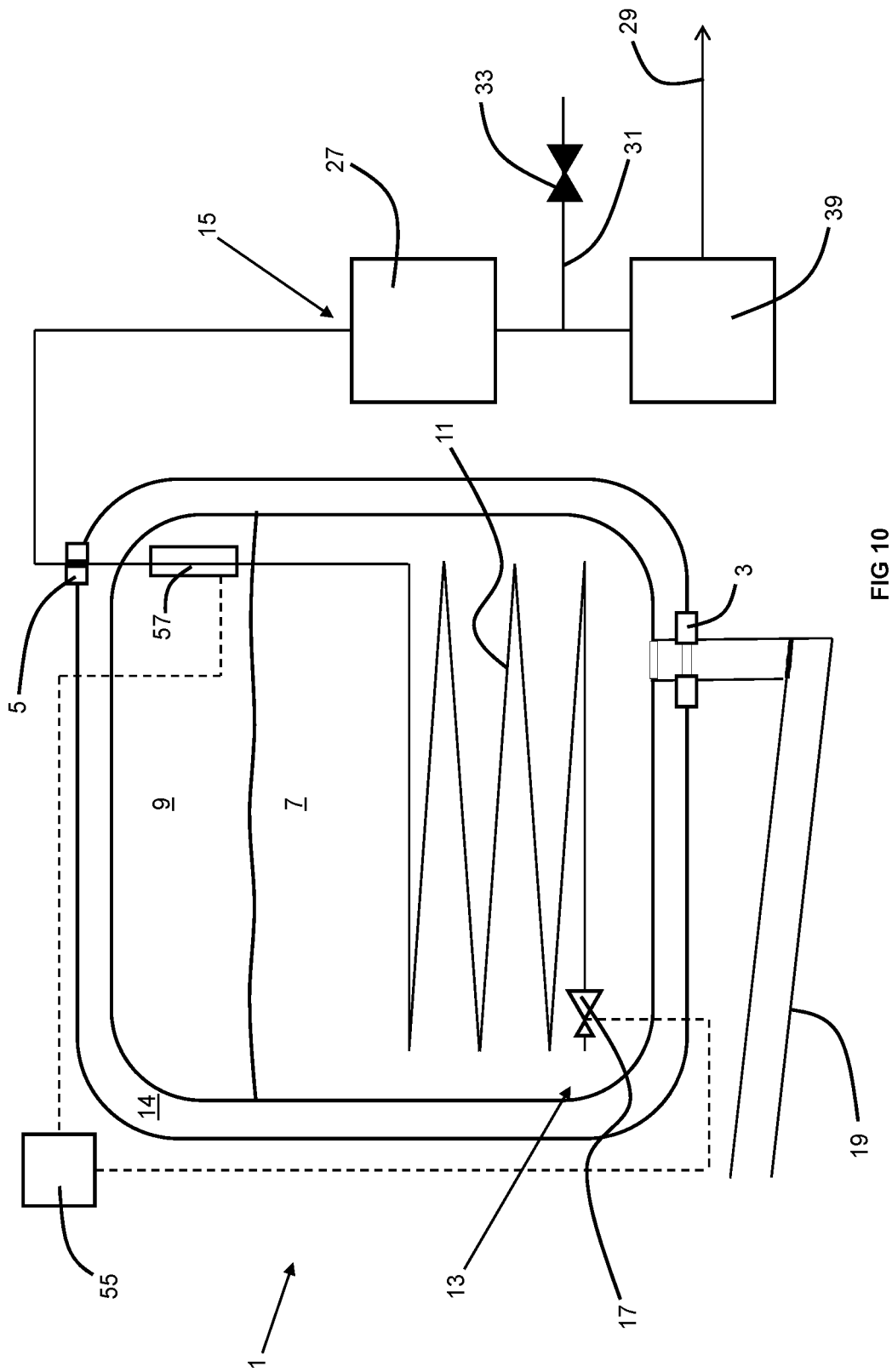
FIG. 10 is a schematic of a variation of the embodiment of FIG. 3, including control of the pressure reducer using a programmable logic controller or distributed control system based upon a difference in pressure at a top and bottom of a phase separator or based upon a liquid level in the phase separator.

As best illustrated in FIG. 10, the apparatus is similar to that shown in FIG. 1 and additionally includes an optional low pressure buffer container 39 in downstream fluid communication from an optional heat exchanger or heater 27 (as described above in the description of FIG. 6), a programmable logic controller (PLC) 55 and a phase separator 57 that includes a liquid level sensor. Optionally, a distributed control system could be substituted for the PLC. The pressure reducer is a pressure control valve or a flow control valve. The PLC receives a signal from liquid level sensor that is representative of a level of liquid cryogen within phase separator 57. Based upon the measured liquid level, the PLC controls operation of the pressure reducer 17 and thus the amount of subcooling of the expanded cryogen. In particular, if the measured liquid level is higher than a predetermined set point, the PLC 55 may increase a pressure drop or flow rate through the pressure reducer 17.

Figure 11:
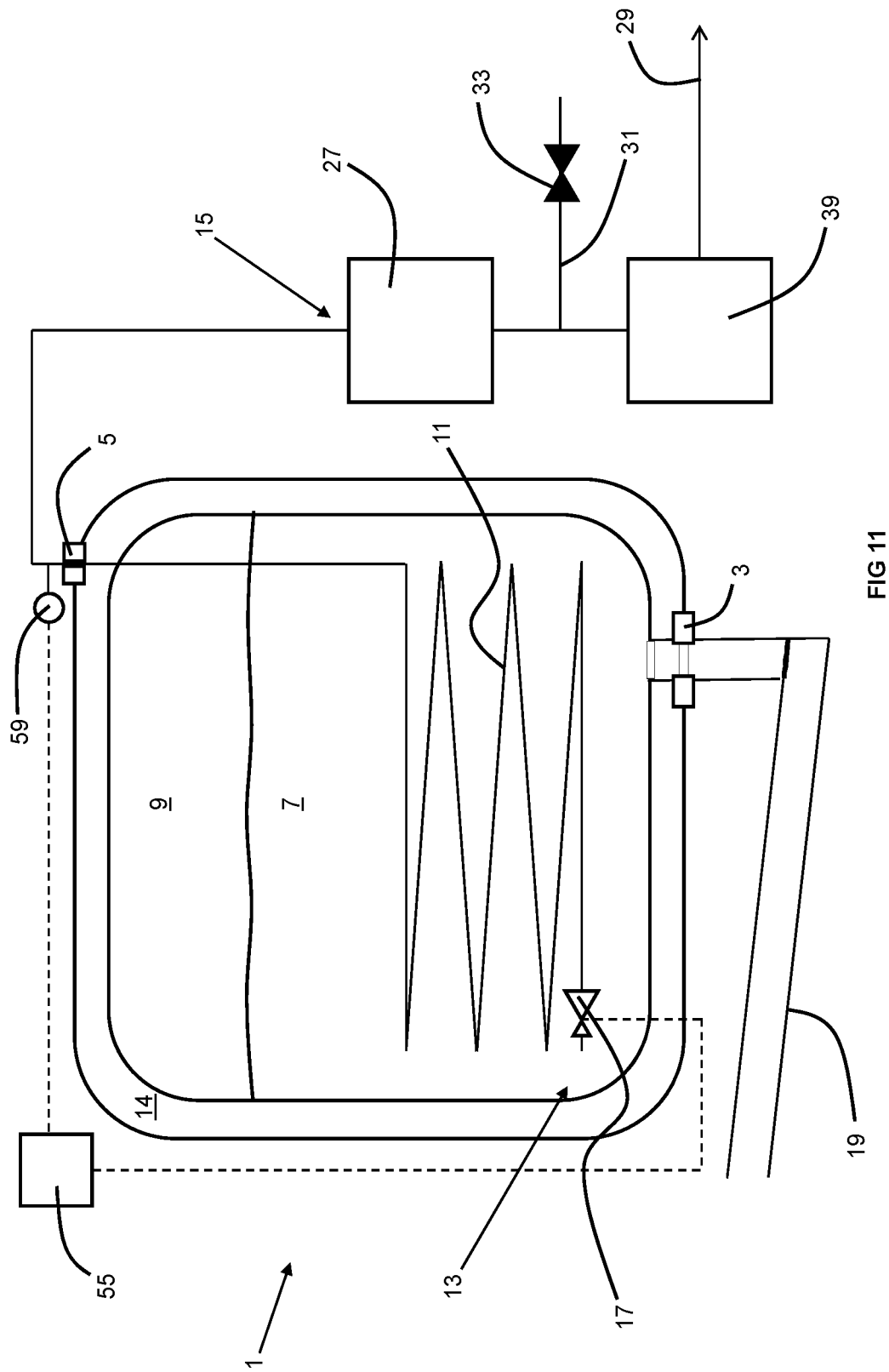
FIG. 11 is a schematic of a variation of the embodiment of FIG. 3, including control of the pressure reducer using a programmable logic controller or distributed control system based upon a pressure or temperature at or adjacent to the vaporized liquid cryogen outlet of the cryogenic storage vessel.

As best shown in FIG. 11, the apparatus is similar to that shown in FIG. 1 and additionally includes an optional low pressure buffer container 39 in downstream fluid communication from an optional heat exchanger or heater 27 (as described above in the description of FIG. 6), a programmable logic controller (PLC) 55, and a pressure or temperature sensor 59. Optionally, a distributed control system could be substituted for the PLC. The pressure reducer is a pressure control valve or a flow control valve. The PLC receives a signal from pressure or temperature sensor 59 that is representative of a pressure or temperature of the expanded cryogen thereat. Based upon the measured pressure or temperature of the expanded cryogen at sensor 59, the PLC controls operation of the pressure reducer 17 and thus the amount of subcooling of the expanded cryogen.

Figure 12:
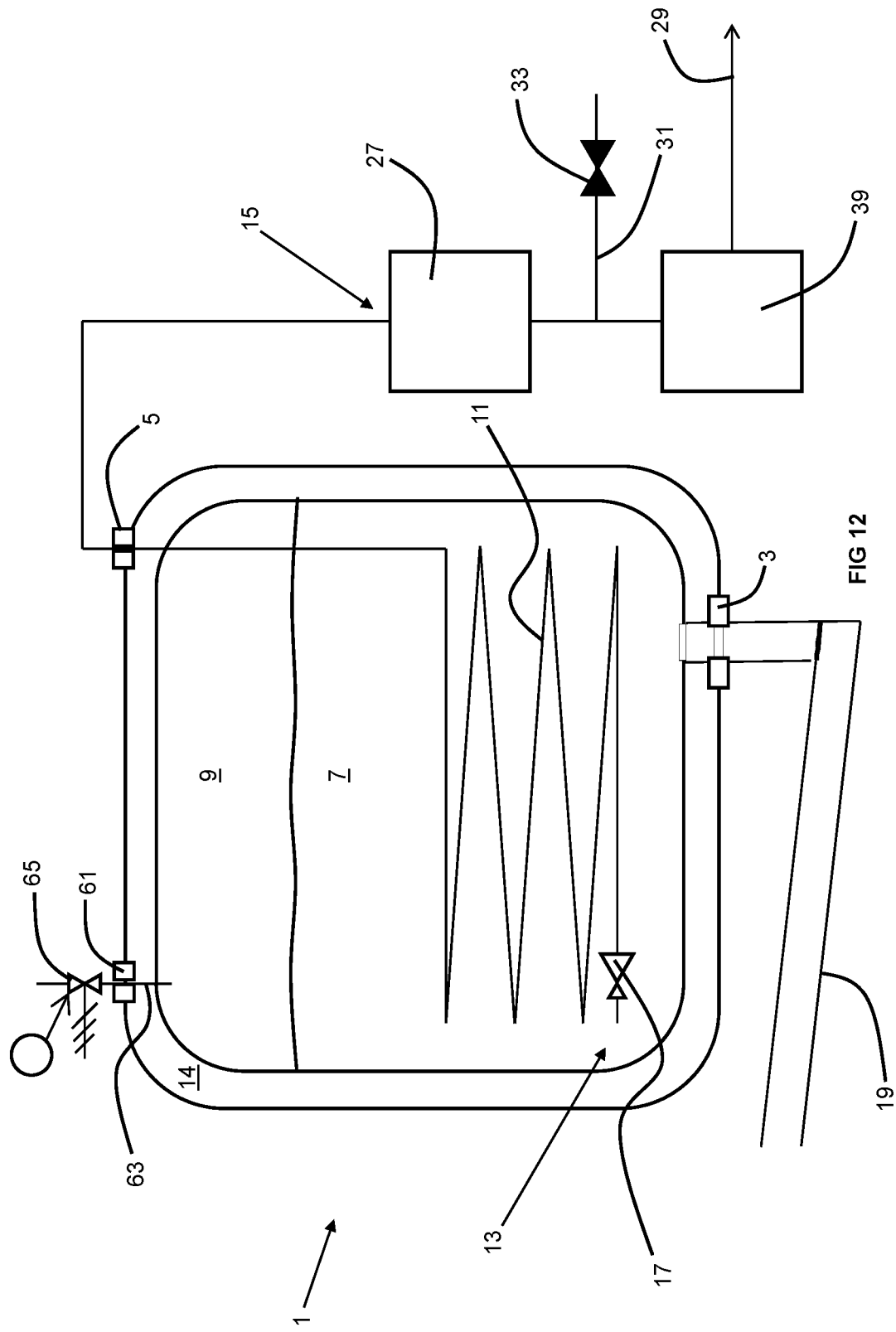
FIG. 12 is a schematic of a variation of the embodiment of FIG. 3, including a safety relief valve.

As best illustrated in FIG. 12, the apparatus is similar to that shown in FIG. 1 and additionally includes an optional low pressure buffer container 39 in downstream fluid communication from an optional heat exchanger or heater 27 (as described above in the description of FIG. 6), a safety vent outlet 61 formed in a wall of the vessel 1, a safety vent tube 63, and a pressure relief valve 65. The pressure relief valve 65 is adapted and configured to open and relieve pressure within the ullage 9 of the vessel 1 if the vapor contained therein exceeds a predetermined set point.

Figure 13:
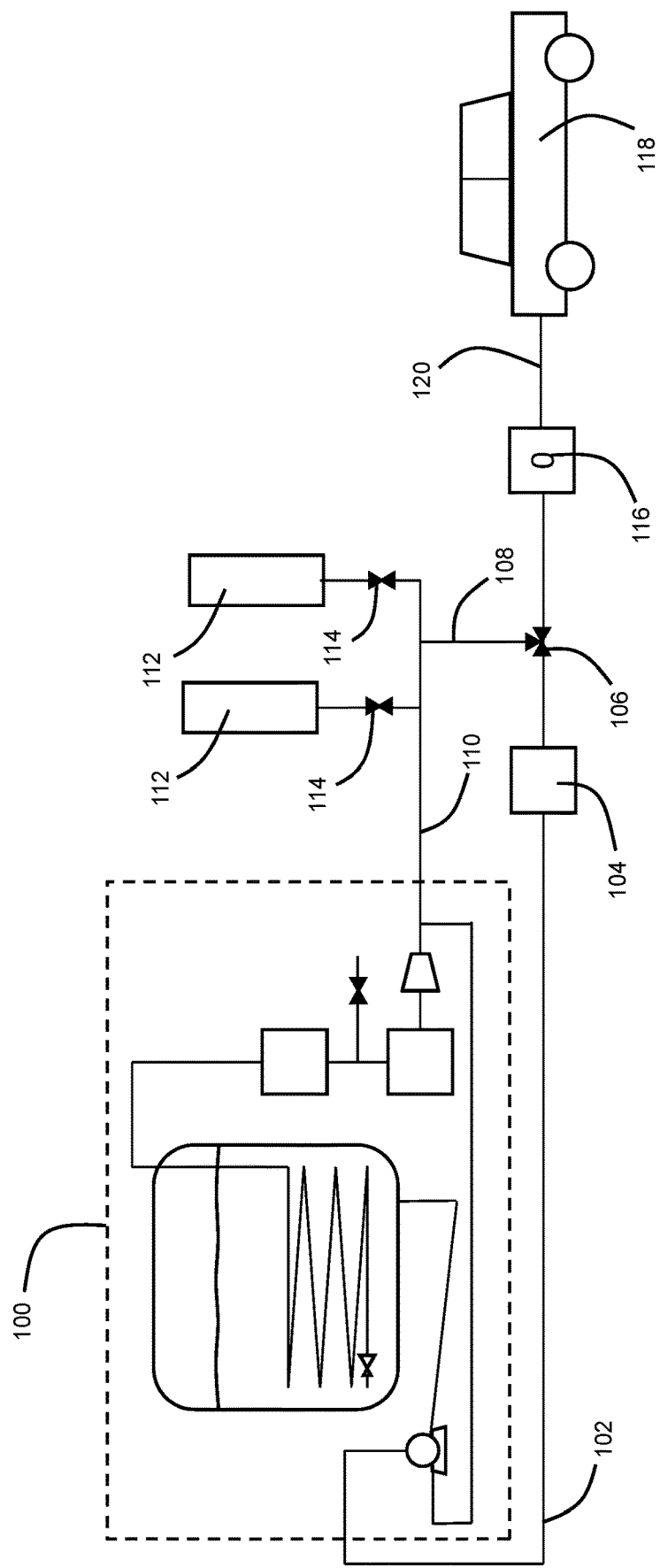
FIG. 13 is a schematic of a hydrogen filling station including the apparatus of the embodiment of FIG. 1.

As best shown in FIG. 13, a hydrogen refueling station for refueling fuel cell electric vehicles with pressurized hydrogen includes one of apparatuses 100 of FIG. 7 (with the heater or heat exchanger being optional). Apparatus 100 yields high pressure liquid hydrogen to feed line 102. Line 102 leads to a vaporizer 104 at which the high pressure liquid hydrogen is heated to produce vaporized hydrogen. It should be noted that, if the pump pressurizes the liquid cryogen to a pressure above the critical pressure, vaporized hydrogen is in the supercritical state. Three-way valve 106 fluidly connects line 102, line 120, and line 108. The gaseous/supercritical hydrogen is optionally cooled at heat exchanger 116 and fed to a fuel cell electric vehicle (FCEV) 118 via a nozzle disposed at the downstream end of line 120.

The hydrogen refueling station also includes a plurality of high pressure buffer containers 112. High pressure buffer containers 112 may be distinguished from the low pressure buffer container by their adaptation and configuration to satisfactorily store the gaseous/supercritical hydrogen at pressures up to 35 MPa, up to 70 MPa, or even higher pressures, whereas the low pressure buffer container need not have a pressure rating that high. Valves 106, 114 may be operated or controlled to allow the high pressure buffer containers to be filled with vaporized liquid cryogen from apparatus 100 via line 110 and/or with gaseous/supercritical hydrogen from line 102 downstream of vaporizer 104. Valves 106, 114 may be operated or controlled to instead direct gaseous/supercritical hydrogen into line 120 for filling FCEV 118 via optional heat exchanger 116 and the nozzle. Valves 106, 114 may also be operated or controlled to instead direct gaseous/supercritical hydrogen from high pressure buffer containers 112 into line 120 where it is used to fill FCEV 118 via line 120 and the nozzle.

Figure 14:
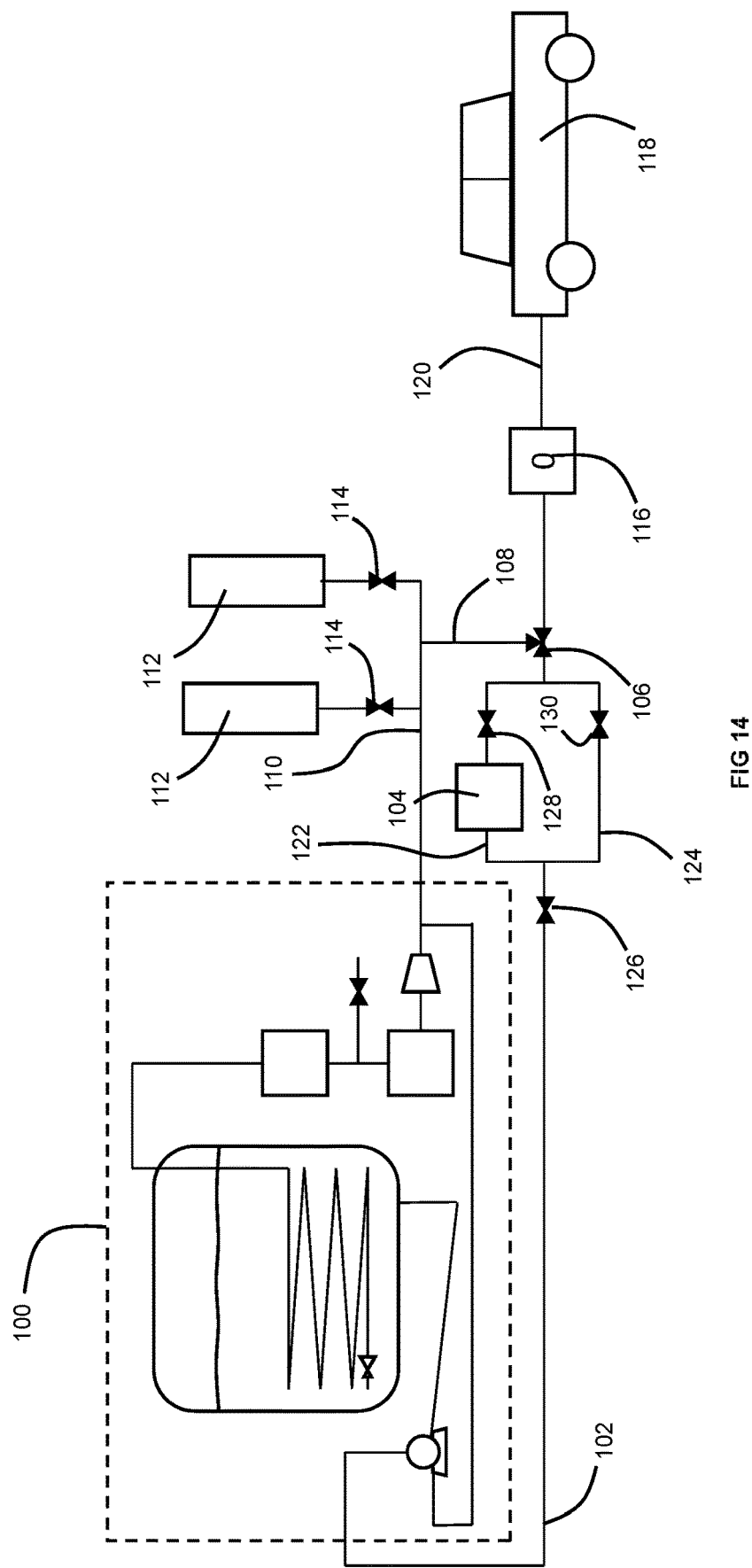
FIG. 14 is a schematic of a variation of the embodiment of FIG. 11, including mixing of liquid cryogen and vaporized liquid cryogen.

As best shown in FIG. 14, a hydrogen refueling station for refueling fuel cell electric vehicles with pressurized hydrogen includes one of apparatuses 100 of FIG. 7 (with the heater or heat exchanger being optional). Apparatus 100 yields high pressure liquid hydrogen to feed line 102. Valve 126 is operable being open and closed orientations to allow or disallow a flow of high pressure liquid hydrogen to parallel lines 122 and 124. Disposed in line 122 is a vaporizer 104 at which the high pressure liquid hydrogen is heated to produce vaporized hydrogen. It should be noted that, if the pump pressurizes the liquid cryogen to a pressure above the critical pressure, vaporized hydrogen is in the supercritical state. Line 124 does not include a vaporizer so the flow of hydrogen through it remains in the liquid state. The flows of gaseous/supercritical and liquid hydrogen are combined in line 120. The relative rates of flows of gaseous/supercritical and liquid hydrogen are controlled by control valves 128, 130, respectively, based upon The flows of gaseous/supercritical hydrogen and liquid hydrogen are combined at a junction of lines 122 and 124 downstream of vaporizer 104. Three-way valve 106 fluidly connects line 102, line 120, and line 108. The gaseous/supercritical hydrogen is optionally cooled at heat exchanger 116 and fed to a fuel cell electric vehicle (FCEV) 118 via a nozzle disposed at the downstream end of line 120.

The hydrogen refueling station also includes a plurality of high pressure buffer containers 112. High pressure buffer containers 112 may be distinguished from the low pressure buffer container by their adaptation and configuration to satisfactorily store the gaseous/supercritical hydrogen at pressures up to 35 MPa, up to 70 MPa, or even higher pressures, whereas the low pressure buffer container need not have a pressure rating that high. Valves 106, 114, 126 may be operated or controlled to allow the high pressure buffer containers to be filled with vaporized liquid cryogen from apparatus 100 via 110 and/or with gaseous/supercritical hydrogen from line 102 downstream of vaporizer 104. Valves 106, 114, 126 may be operated or controlled to instead direct gaseous/supercritical hydrogen into line 120 for filling FCEV 118 via optional heat exchanger 116 and the nozzle. Valves 106, 114, 126 may also be operated or controlled to instead direct gaseous/supercritical hydrogen from high pressure buffer containers 112 into line 120 where it is used to fill FCEV 118 via line 120 and the nozzle.

Line 120 is connected at its downstream end to fuel cell electric vehicle 118 via a nozzle. Based upon a temperature of the mixed flow measured by a temperature sensor disposed between three-way valve 106 and the nozzle, a PLC (or optionally a distributed control system) controls valves 128, 130 to achieve a desired temperature in the mixed flow.

Figure 15:
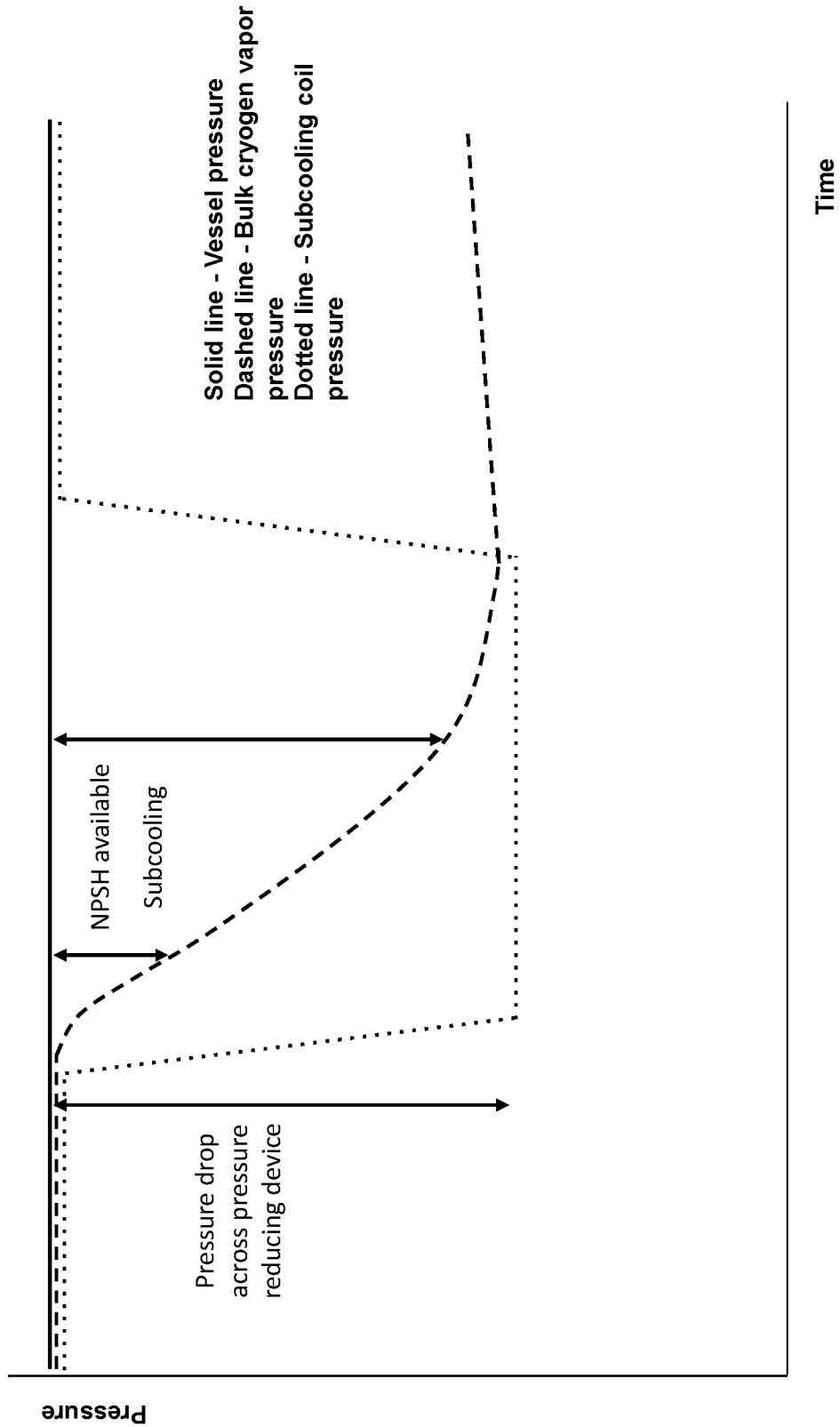
FIG. 15 is a graph of expanded cryogen pressure and bulk liquid cryogen vapor pressure vs time for a prophetic example of the subcooling effect of the invention during which the pressure reduction achieved by the pressure reducer is fixed and the expanded cryogen is fed to the suction inlet of a compressor.

In a prophetic example of the subcooling effect of the invention, the pressure reduction achieved by the pressure reducer is fixed and the expanded cryogen is fed to the suction inlet of a compressor. As best illustrated in FIG. 15, the expanded cryogen pressure and bulk liquid cryogen vapor pressure may be expected to follow the graphed plots.

Figure 16:
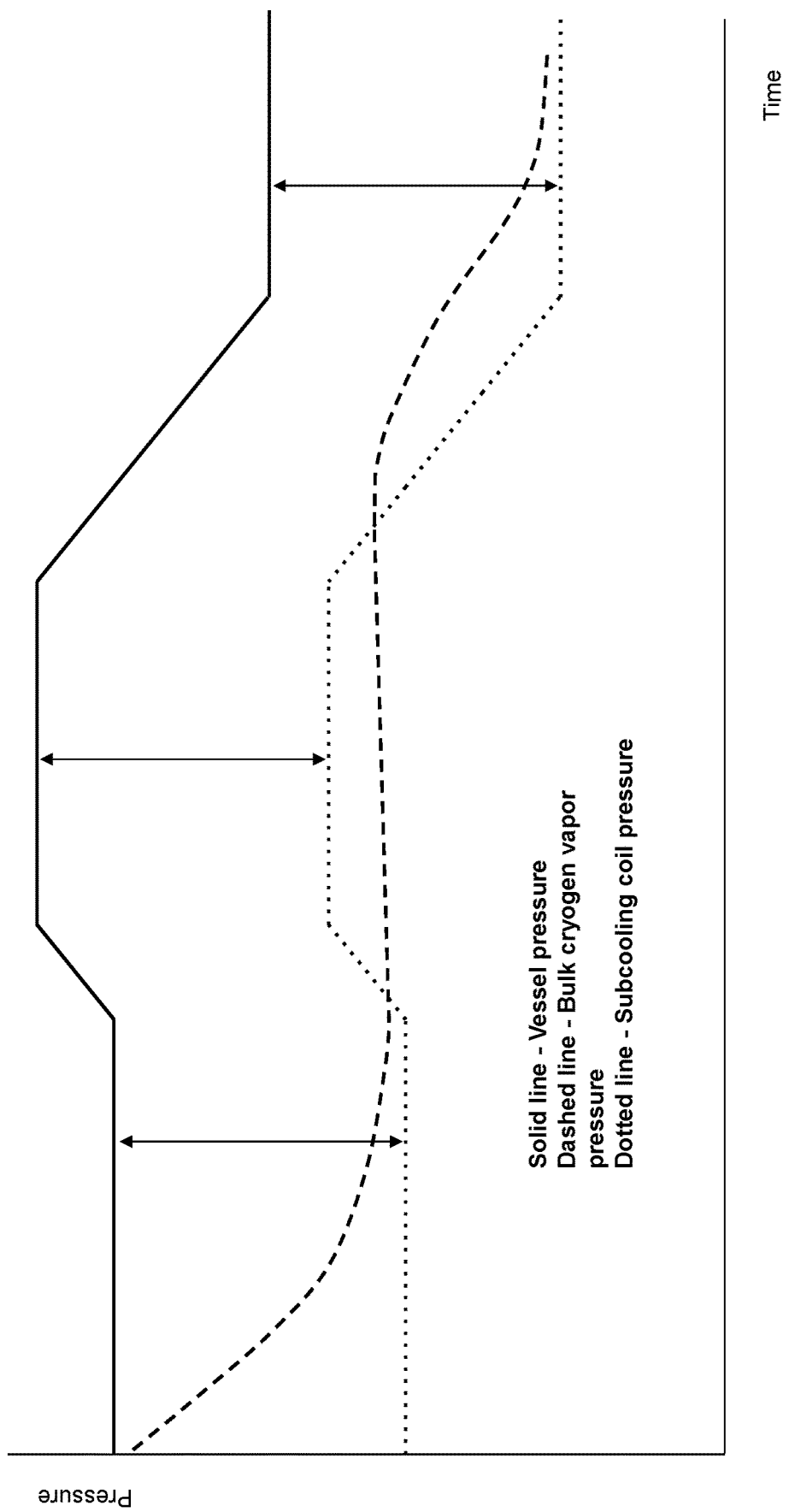
FIG. 16 is a graph of expanded cryogen pressure and bulk liquid cryogen vapor pressure vs time for a prophetic example of the subcooling effect of the invention during which the pressure reduction achieved by the pressure reducer is fixed and the vessel pressure is varied.

In a variation of the prophetic example, while the expanded cryogen is similarly fed to the suction inlet of a compressor and the pressure reduction achieved by the pressure reducer is similarly fixed, the vessel pressure is varied. As shown in FIG. 16, if the vessel pressure is raised high enough, the pressure of the expanded cryogen exceeds the vapor pressure of the bulk cryogen.

Figure 17:
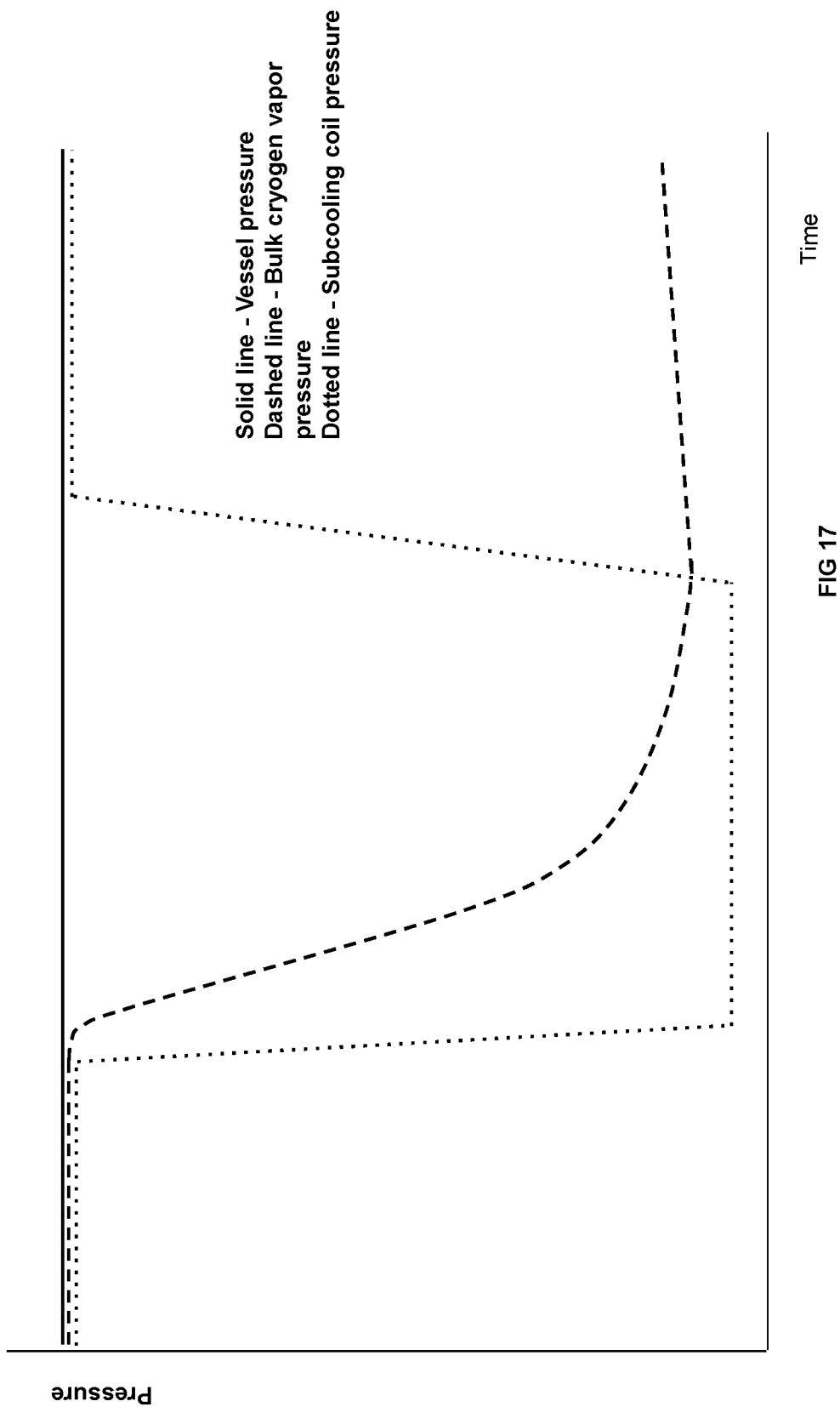
FIG. 17 is a graph of expanded cryogen pressure and bulk liquid cryogen vapor pressure vs time for a prophetic example of the subcooling effect of the invention during which the pressure reduction achieved by the pressure reducer is fixed and the expanded cryogen is vented.

In another variation of the prophetic example, while the vessel pressure and pressure reduction achieved by the pressure reducer are constant, the expanded cryogen is vented instead of being fed to the suction inlet of a compressor. As illustrated in FIG. 17, the pressure of the expanded cryogen is low because it is vented.

Figure 18:
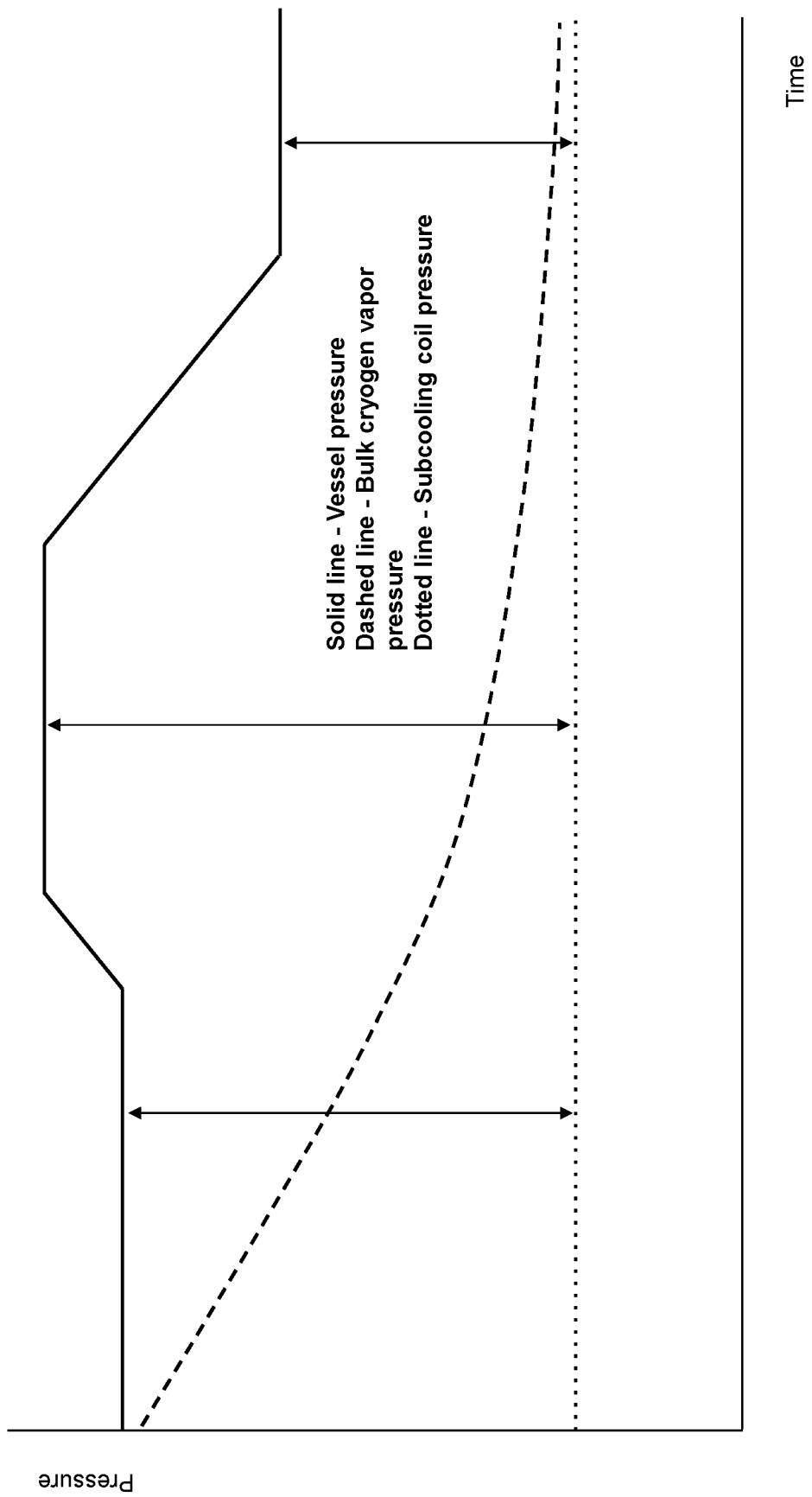
FIG. 18 is a graph of expanded cryogen pressure and bulk liquid cryogen vapor pressure vs time for a prophetic example of the subcooling effect of the invention during which the vessel pressure is varied and the pressure reduction achieved by the pressure reducer is controlled so as to achieve a fixed expanded cryogen pressure regardless of the vessel pressure.

In another variation of the prophetic example, the vessel pressure is varied and the pressure reduction of the pressure reducer is controlled so as to achieve a fixed expanded cryogen pressure regardless of the vessel pressure, as shown in FIG. 18.

Impact of $NPSH_A$ on Pump Performance

Figure 19:
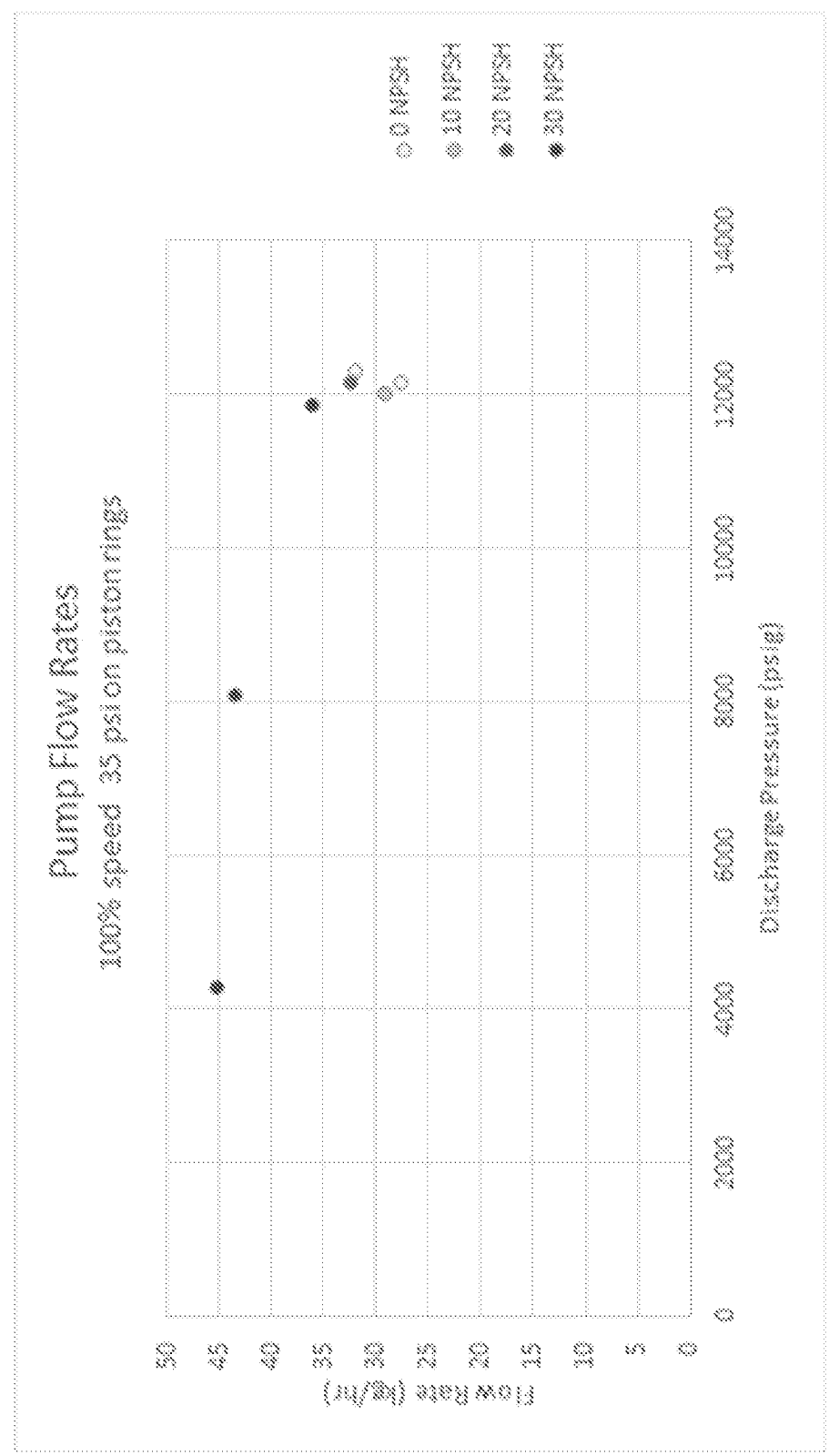
FIG. 19 is a graph of pump flow rate vs. pump discharge pressure for different values of $NPSH_A$.
Figure 20:
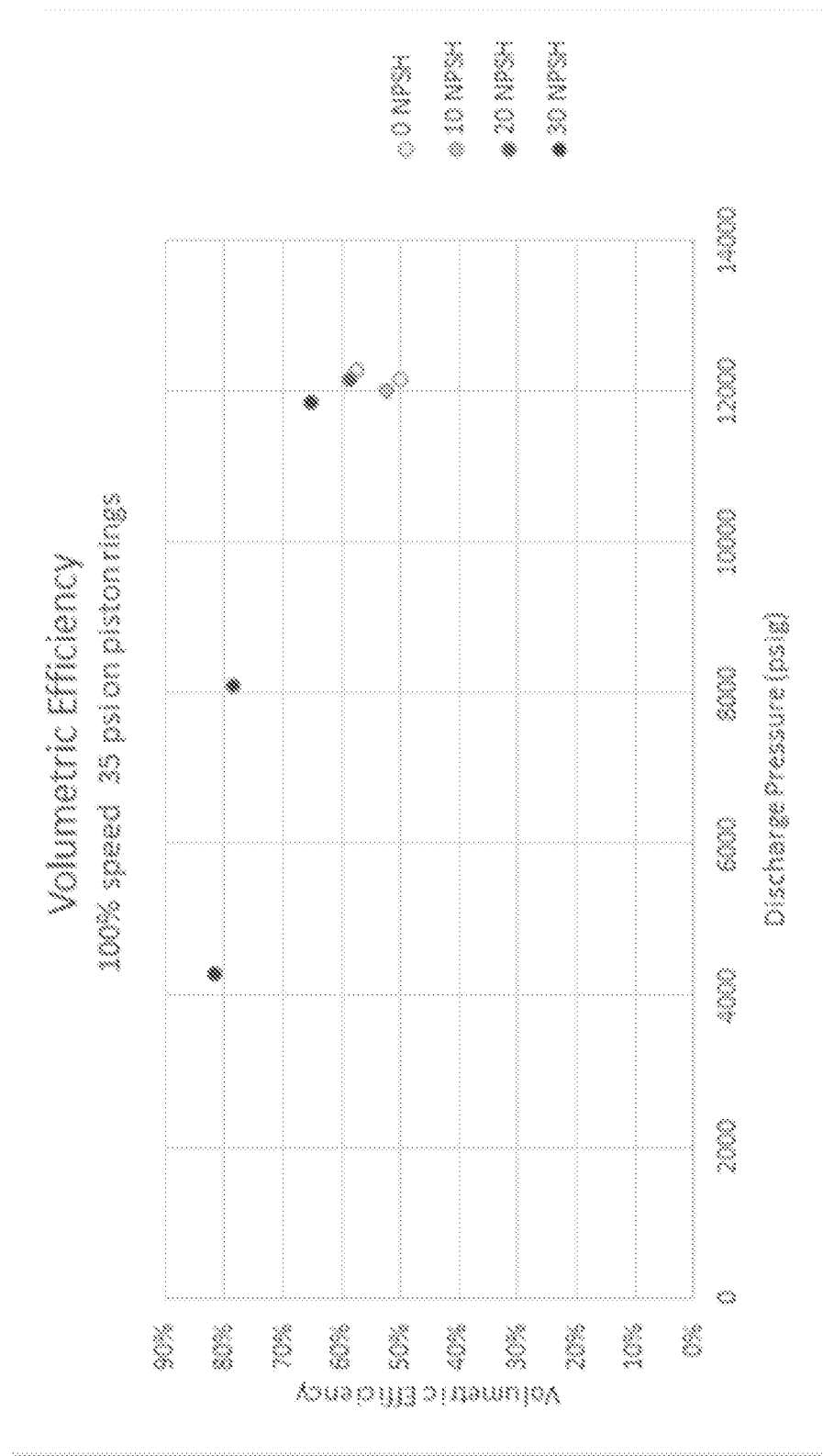
FIG. 20 is a graph of pump volumetric efficiency vs. pump discharge pressure for different values of $NPSH_A$.

In order to demonstrate advantages of the invention related to pumping liquid cryogen, the estimated $NPSH_A$ was derived from the measured conditions associated with pumping conditions, vessel pressure, and vessel temperature, inter alia, that varied over time. The pump flow rate was also recorded and the pump's volumetric efficiency was calculated. The pump flow rate and the pump volumetric efficiency was then plotted against the calculated $NPSH_A$. During testing of the pump, the bulk liquid hydrogen within the vessel was evaporatively cooled through the conventional technique of vessel venting and then the pressure in the vessel was increased with a pressure building circuit. As seen in FIGS. 19-20, the pump flow rate and volumetric efficiency changed drastically at different levels of subcooling As shown in the graphs of FIGS. 19-20, significantly better pump performance is observed when the bulk cryogen is sufficiently subcooling and the resulting $NPSH_A$ is made available. Over the course of the batch of liquid hydrogen, the hydrogen in the tank continuously absorbs heat from multiple sources, and the vapor pressure of the liquid increases. Without subcooling, eventually the $NPSH_A$ will become so small that the pump will not pressurize to high pressures. At this point, the vessel must be vented dramatically in order to decrease the pressure in the vessel (which also causes the vapor pressure of the bulk cryogen to decrease). The cryogen losses incurred in that type of conventional subcooling process can make up a significant portion of the cryogen used at the pumping site.

The invention provides many advantages:

Subcooling the bulk cryogen is advantageous for multiple reasons.

In order to enable relatively warm liquid cryogen stored at the liquid cryogen production site, the liquid cryogen needs to be cooled in order to achieve the customer's specifications at delivery.

After being contained within a transport container for long durations of time along the delivery route from the production site to the customer site, the liquid cryogen will have become somewhat warmed. Alternatively, in order to provide for a buffer of refrigeration against inevitable heat leaks into the transport container, the liquid cryogen may first be subcooled.

As explained above, in order to efficiently pump an amount of liquid cryogen remaining in the transport container after deliveries are completed, the remaining amount of liquid cryogen may need to be cooled because its heat content is too high.

After sitting for some period of time in the storage container at the customer site, the liquid cryogen may need to be subcooled prior to pumping in order to provide a greater pumping efficiency.

The subcooling conduit allows heat to be removed from the bulk cryogen over a long duration. Even with a small flow rate through the subcooling conduit, the heat removal over the long duration has the ability to sufficiently subcool the bulk cryogen. Some prior art references uses vaporization to subcool the bulk cryogen only as the pump is running, and as a result, the flow rate through the subcooling conduit is much greater and must be run in conjunction with the pump.

The subcooling conduit will counteract the warming that occurs during the normal course of liquid cryogen distribution. Cooling available at the end user's location will allow warm cryogen to be as useful/valuable for the end user as cold cryogen. The invention allows more flexible distribution of liquid cryogen to the sites. The pumping sites will no longer require the first delivery after the transport is filled from the liquid cryogen source, such as a liquefaction plant. This relieves a major constraint on the distribution system that confines delivery order, the miles driven, and value of product after the first delivery.

As seen above, merely venting of the cryogen is no longer the most effective way to cool the bulk cryogen. The invention allows the bulk cryogen to be subcooled without the necessity to vent the product. There are many advantages associated with this:

- The invention allows the pump to continue running while the subcooling is taking place. All methods of evaporative cooling require that the liquid is boiling and the NPSHA is 0. Under these conditions the pump cannot run, whereas the pump can run while the subcooling coil is operating.
- The invention uses less cryogen in order to provide cooling. The invention uses the cryogen itself to provide high quality (cold) liquid cryogen and the vapor is recoverable with a compressor. The amount of cryogen used by the subcooling coil is less than the amount used through evaporative cooling because the headspace of the vessel does not have to be vented to provide cooling and the bulk cryogen does not have to be vaporized, to build the necessary pressure in the headspace of the vessel after the subcooling is performed.
- The subcooling coil can operate intermittently making on and off operation of the subcooling coil easy to manage.
- Cooling provided by the subcooling coil is immediately effective.
- This invention allows hydrogen to remain in the LH2 vessel for a significant period of time and still be useful for a pump. This removes a constraint from the distribution system because a new delivery of hydrogen does not need to be made after a specific duration.
- This invention will allow the pump site operator to decrease the minimum operating level of the LH2 vessel. This relieves another constraint on the distribution system and will allow more flexibility of the timing for deliveries, and it will also increase the maximum delivery size.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A liquid cryogen storage apparatus having subcooling capability, comprising:
    a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and
    a hollow metal conduit at least partly disposed within the vessel that has an open first end disposed within the liquid cryogen space and a second end that is connected to or extends through the vaporized liquid cryogen outlet, wherein:
    a pressure reducer is disposed either within the conduit or at the first end that is adapted and configured to flash the liquid cryogen entering into the conduit into a biphasic mixture of liquid cryogen and vaporized liquid cryogen;
    when the vessel is partially filled with a liquid cryogen, an exterior surface of the conduit is in direct contact with the liquid cryogen; and
    the conduit is adapted and configured to transfer heat to the biphasic mixture from the liquid cryogen in the liquid cryogen space and vaporize at least some of the liquid cryogen in the biphasic mixture,
    wherein the pressure reducer is an automatically controlled flow rate control valve or pressure control valve and the apparatus further comprises a programmable logic controller or distributed control system coded with PID control logic that is adapted and configured to control operation of the pressure reducer,
    a differential pressure sensor is adapted and configured to measure a differential pressure between a pressure in the conduit at a position adjacent to, and downstream of, the pressure reducer and a pressure in the conduit at a position within the vessel above a surface of the liquid cryogen or adjacent or at the second end, and the pressure reducer is controlled by the programmable logic controller or distributed control system based upon the measured differential pressure.

2. The apparatus of claim 1, wherein the pressure reducer is a fixed orifice or nozzle having a fixed open cross-sectional surface area.

3. The apparatus of claim 1, wherein the pressure reducer is a manually adjustable valve or reducer.

4. The apparatus of claim 1, wherein the pressure reducer is an automatically controlled flow rate control valve or pressure control valve and the apparatus further comprises a programmable logic controller or distributed control system coded with PID control logic that is adapted and configured to control operation of the pressure reducer.

5. The apparatus of claim 4, further comprising a phase separator disposed in the conduit above a surface of the liquid cryogen space upstream and a level sensor adapted and configured to measure a level of liquid cryogen in the phase separator, wherein the pressure reducer is controlled by the programmable logic controller or distributed control system based upon the measured liquid level.

6. A liquid cryogen storage apparatus having subcooling capability, comprising:
  a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and
  a hollow metal conduit at least partly disposed within the vessel that has an open first end disposed within the liquid cryogen space and a second end that is connected to or extends through the vaporized liquid cryogen outlet, wherein;
  a pressure reducer is disposed either within the conduit or at the first end that is adapted and configured to flash the liquid cryogen entering into the conduit into a biphasic mixture of liquid cryogen and vaporized liquid cryogen,
  when the vessel is partially filled with a liquid cryogen, an exterior surface of the conduit is in direct contact with the liquid cryogen; and
  the conduit is adapted and configured to transfer heat to the biphasic mixture from the liquid cryogen in the liquid cryogen space and vaporize at least some of the liquid cryogen in the biphasic mixture,
  wherein the pressure reducer is an automatically controlled flow rate control valve or pressure control valve and the apparatus further comprises a programmable logic controller or distributed control system coded with PID control logic that is adapted and configured to control operation of the pressure reducer,
  a pressure sensor that is adapted and configured to measure a pressure of the vaporized liquid cryogen in the conduit between a position in between a location above a level of the liquid cryogen space within the vessel and a position at or adjacent to the second end, wherein the pressure reducer is controlled by the programmable logic controller or distributed control system based upon the measured pressure.

7. The apparatus of claim 4, further comprising a temperature sensor adapted and configured to measure a temperature of the vaporized liquid cryogen within the conduit or exiting the conduit, wherein the pressure reducer is controlled by the programmable logic controller or distributed control system based upon the measured temperature.

8. The apparatus of claim 1, wherein said vessel adapted and configured to store liquid hydrogen.

9. The apparatus of claim 4, wherein a portion of the conduit between the first and second ends extends into a vacuum space between adjacent walls of the vessel and the pressure reducer is disposed in the portion of the conduit that extends into the annular vacuum space.

10. The apparatus of claim 4, wherein a portion of the conduit between the first and second ends extends out of the vessel and the pressure reducer is disposed in the portion of the conduit that extends out of the vessel.

11. The apparatus of claim 1, further comprising a low pressure buffer container in downstream fluid communication with the conduit, the low pressure buffer container having a vaporized liquid cryogen inlet that is adapted and configured to receive the vaporized liquid cryogen from the second end and an end-use outlet and a feed line connected thereto that has a terminal end that is adapted and configured to be connected to an end-use.

12. The apparatus of claim 11, further comprising a pressure sensor that is adapted and configured to measure a pressure of the vaporized liquid cryogen at a location between a position in the conduit at a location within the vessel above a level of the liquid cryogen space and a position at or adjacent to the terminal end, wherein the pressure reducer is controlled by the programmable logic controller or distributed control system based upon the measured pressure.

13. The apparatus of claim 11, further comprising a temperature sensor that is adapted and configured to measure a temperature of the vaporized liquid cryogen at a location between a position in the conduit at a location within the vessel above a level of the liquid cryogen space and a position at or adjacent to the terminal end, wherein the pressure reducer is controlled by the programmable logic controller or distributed control system based upon the measured temperature.

14. The apparatus of claim 1, further comprising a safety vent comprising a pressure relief valve disposed in a safety vent tube that is in fluid communication with a safety vent outlet disposed in a wall of the vessel, the pressure relief valve being adapted and configured to open when a pressure of the ullage is at or above a predetermined pressure and close when the pressure of the ullage is below a predetermined pressure.

15. The apparatus of claim 1, further comprising a vent line in downstream fluid communication with the vaporized liquid cryogen outlet, a heat exchanger or heater adapted and configured to warm the vaporized liquid cryogen received into the vent line, the vent line being adapted and configured to vent the vaporized liquid cryogen from the vent line and to the atmosphere.

16. The apparatus of claim 15, further comprising a low pressure buffer container in downstream fluid communication with the vaporized liquid cryogen outlet and the vent line, the low pressure buffer container having an end-use outlet being adapted and configured to be connected to an end-use of the vaporized liquid cryogen contained therein, the low pressure buffer container having a volume greater than the conduit and being adapted and configured to reduce pressure variations of the vaporized liquid cryogen exiting the end-use outlet.

17. The apparatus of claim 1, further comprising a programmable logic controller or distributed control system and also a compressor having a suction inlet in fluid communication with the second end and an outlet in fluid communication with a feed line, wherein the pressure reducer is an automatically controlled flow rate control valve or pressure control valve and programmable logic controller or distributed control system is coded with PID control logic that is adapted and configured to control operation of the pressure reducer.

18. A hydrogen refueling station for refueling fuel cell electric vehicles with pressurized hydrogen, comprising:
one or more liquid hydrogen storage apparatuses, wherein the liquid hydrogen storage apparatus comprises:
a closed insulated cryogenic storage vessel adapted and configured to store liquid hydrogen, the vessel comprising a liquid hydrogen outlet disposed in a wall thereof and a vaporized liquid hydrogen outlet disposed in a wall thereof, wherein when the vessel is partially filled with a liquid hydrogen, an interior of the vessel is divided into a liquid hydrogen space and an ullage above the liquid hydrogen space; and
a hollow metal conduit at least partly disposed within the vessel that has an open first end disposed within the liquid hydrogen space and a second end that is connected to or extends through the vaporized liquid hydrogen outlet, wherein:
a pressure reducer is disposed either within the conduit or at the first end that is adapted and configured to flash the liquid hydrogen entering into the conduit into a biphasic mixture of liquid hydrogen and vaporized liquid hydrogen;
when the vessel is partially filled with a liquid hydrogen, an exterior surface of the conduit is in direct contact with the liquid hydrogen; and
the conduit is adapted and configured to transfer heat to the biphasic mixture from the liquid hydrogen in the liquid hydrogen space and vaporize at least some of the liquid hydrogen in the biphasic mixture;
wherein the hydrogen refueling station further comprises:
one or more pumps in downstream fluid communication with the one or more liquid hydrogen storage apparatuses, wherein each of the one or more pumps is adapted and configured to receive liquid hydrogen from the one or more liquid hydrogen storage wherein each of the one or more s which is adapted and apparatuses via the liquid cryogen outlet;
one or more vaporizers in downstream fluid communication with the one or more pumps that is adapted and configured to vaporize the pumped liquid hydrogen and produce pressurized gaseous hydrogen;
one or more high pressure buffer containers in downstream fluid communication with the one or more vaporizers that is adapted and configured to store the pressurized gaseous hydrogen; and
one or more nozzles in downstream fluid communication with the one or more vaporizers and one or more high pressure buffer containers that is adapted and configured to be connected in fluid communication with a tank of a fuel cell electric device and dispense the pressurized gaseous hydrogen thereto,
a compressor in downstream fluid communication with the second end that is adapted and configured to compress the vaporized liquid cryogen exiting the vent line;
a feed line adapted and configured to receive the compressed vaporized liquid cryogen and feed the compressed vaporized to the one or more high pressure buffer containers; and
a pressure sensor that is adapted and configured to measure a pressure of the vaporized liquid cryogen at a position between a location in the conduit above a level of the liquid cryogen space within the vessel and a position at or adjacent to a suction inlet of the compressor, wherein the pressure reducer is controlled by the programmable logic controller or distributed control system based upon the measured temperature.

19. The hydrogen refueling station of claim 18, further comprising a compressor in downstream fluid communication with the second end that is adapted and configured to compress the vaporized liquid cryogen exiting the vent line, and a feed line adapted and configured to receive the compressed vaporized liquid cryogen and feed the compressed vaporized to the one or more high pressure buffer containers.

20. The hydrogen refueling station of claim 19, further comprising a safety vent comprising a pressure relief valve disposed in a safety vent tube that is in fluid communication with a safety vent outlet disposed in a wall of the vessel, the pressure relief valve being adapted and configured to open when a pressure of the ullage is at or above a predetermined pressure and close when the pressure of the ullage is below a predetermined pressure, wherein the safety vent is in upstream fluid communication with a suction inlet of the compressor.

21. The hydrogen refueling station of claim 18, wherein the pressure reducer is an automatically controlled flow rate control valve or pressure control valve and said station further comprises a programmable logic controller or distributed control system coded with PID control logic that is adapted and configured to control operation of the pressure reducer.

22. The hydrogen refueling station of claim of claim 21, further comprising:
a compressor in downstream fluid communication with the second end that is adapted and configured to compress the vaporized liquid cryogen exiting the vent line;
a feed line adapted and configured to receive the compressed vaporized liquid cryogen and feed the compressed vaporized to the one or more high pressure buffer containers; and
a temperature sensor adapted and configured to measure a temperature of the vaporized liquid cryogen at a position between a location within the conduit above a level of the liquid cryogen space within the vessel or a position at or adjacent to a suction inlet of the compressor, wherein the pressure reducer is controlled by the programmable logic controller or distributed control system based upon the measured temperature.

23. A method of subcooling a liquid cryogen, comprising the steps of:
providing an apparatus comprising:
a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and
a hollow metal conduit at least partly disposed within the vessel that has an open first end disposed within the liquid cryogen space and a second end that is connected to or extends through the vaporized liquid cryogen outlet, wherein:
a pressure reducer is disposed either within the conduit or at the first end that is adapted and configured to flash the liquid cryogen entering into the conduit into a biphasic mixture of liquid cryogen and vaporized liquid cryogen;

when the vessel is partially filled with a liquid cryogen, an exterior surface of the conduit is in direct contact with the liquid cryogen; and the conduit is adapted and configured to transfer heat to the biphasic mixture from the liquid cryogen in the liquid cryogen space and vaporize at least some of the liquid cryogen in the biphasic mixture, wherein the vessel is storing a cryogen in liquid form;

allowing the liquid cryogen in the liquid cryogen space to enter the conduit and have a pressure thereof be reduced by the pressure reducer, thereby producing a cooled biphasic mixture of the cryogen in liquid and vaporized forms, wherein the cooled biphasic mixture has a temperature lower than that of the liquid cryogen in the liquid cryogen space, allowing a flow of the vaporized liquid cryogen from the conduit and into a low pressure buffer container;

compressing the vaporized liquid cryogen from the low pressure buffer container with a compressor in downstream flow communication with the low pressure buffer; and feeding the compressed vaporized liquid cryogen to an end-use from a terminal end of a feed line in fluid communication between the compressor and the end-use, measuring, with a pressure sensor, a pressure of the vaporized liquid cryogen at a location between a position in the conduit at a location within the vessel above a level of the liquid cryogen space and a position at or adjacent to the terminal end; and controlling operation of the pressure reducer with the programmable logic controller or distributed control system based upon the measured pressure.

24. The method of claim 23, wherein the pressure reducer is an automatically controlled flow rate control valve or pressure control valve and said method further comprises the steps of:

measuring, with a differential pressure sensor, a differential pressure between a pressure in the conduit at a position adjacent to, and downstream of, the pressure reducer and a pressure in the conduit at a position within the vessel above a surface of the liquid cryogen or adjacent or at the second end; and controlling operation of the pressure reducer with a programmable logic controller or distributed control system, coded with PID control logic, based upon the measured differential pressure.

25. The method of claim 23, wherein the pressure reducer is an automatically controlled flow rate control valve or pressure control valve, a phase separator is disposed in the conduit above a surface of the liquid cryogen space, and said method further comprises the steps of:

measuring, with a level sensor, a level of liquid cryogen in the phase separator; and controlling operation of the pressure reducer with the programmable logic controller or distributed control system based upon the measured liquid level.

26. The method of claim 23, wherein the pressure reducer is an automatically controlled flow rate control valve or pressure control valve and said method further comprises the steps of:

measuring, with a pressure sensor, a pressure of the vaporized liquid cryogen in the conduit between a position in between a location above a level of the liquid cryogen space within the vessel and a position at or adjacent to the second end; and controlling operation of the pressure reducer with the programmable logic controller or distributed control system based upon the measured pressure.

27. The method of claim 23, wherein the pressure reducer is an automatically controlled flow rate control valve or pressure control valve and said method further comprises the steps of:

measuring, with a temperature sensor, a temperature of the vaporized liquid cryogen within the conduit or exiting the conduit; and controlling operation of the pressure reducer with the programmable logic controller or distributed control system based upon the measured temperature.

28. The method of claim 23, further comprising the steps of:

measuring, with a temperature sensor, a temperature of the vaporized liquid cryogen at a location between a position in the conduit at a location within the vessel above a level of the liquid cryogen space and a position at or adjacent to the terminal end; and controlling operation of the pressure reducer with the programmable logic controller or distributed control system based upon the measured temperature.

29. The method of claim 23, wherein the liquid cryogen is liquid hydrogen.

30. The method of claim 29, further comprising the steps of:

pumping liquid hydrogen from vessel;

vaporizing the pumped hydrogen in a vaporizer;

feeding the vaporized hydrogen to one or more high pressure buffer containers; and feeding the vaporized hydrogen from the one or more high pressure to a tank of a fuel cell electric device via a nozzle in fluid communication between the one or more buffer containers and the fuel cell electric device.

31. A method of subcooling a liquid cryogen, the method comprising the steps of:

providing an apparatus comprising:

a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and a hollow metal conduit at least partly disposed within the vessel that has an open first end disposed within the liquid cryogen space and a second end that is connected to or extends through the vaporized liquid cryogen outlet, wherein:

a pressure reducer is disposed either within the conduit or at the first end that is adapted and configured to flash the liquid cryogen entering into the conduit into a biphasic mixture of liquid cryogen and vaporized liquid cryogen;

when the vessel is partially filled with a liquid cryogen, an exterior surface of the conduit is in direct contact with the liquid cryogen; and the conduit is adapted and configured to transfer heat to the biphasic mixture from the liquid cryogen in the liquid cryogen space and vaporize at least some of the liquid cryogen in the biphasic mixture, wherein the vessel is storing a cryogen in liquid form, and allowing the liquid cryogen in the liquid cryogen space to enter the conduit and have a pressure thereof be reduced by the pressure reducer, thereby producing a cooled biphasic mixture of the cryogen in liquid and vaporized forms, wherein the cooled biphasic mixture has a temperature lower than that of the liquid cryogen in the liquid cryogen space, wherein the apparatus is disposed at a liquid cryogen production facility that produces the liquid cryogen that is stored in the vessel and said method further comprises a step of feeding the liquid cryogen from the vessel into a trailer tanker of a liquid cryogen transport vehicle, the liquid cryogen produced by the liquid cryogen production facility being cooled in the vessel before said step of feeding.

32. The method of claim 23, wherein the vessel is a trailer tanker of a liquid cryogen transport vehicle and said method further comprises the steps of producing the liquid cryogen, to be stored in the vessel, at a liquid cryogen production facility, feeding the liquid cryogen that is produced by the facility into the trailer tanker, using the liquid cryogen transport vehicle to transport the liquid cryogen fed into the trailer tanker from the facility to an end-user facility that includes a liquid cryogen storage tank, wherein during said step of using, performing said step of allowing.

33. A method of subcooling a liquid cryogen, the method comprising the steps of:

providing an apparatus comprising:

a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and a hollow metal conduit at least partly disposed within the vessel that has an open first end disposed within the liquid cryogen space and a second end that is connected to or extends through the vaporized liquid cryogen outlet, wherein, a pressure reducer is disposed either within the conduit or at the first end that is adapted and configured to flash the liquid cryogen entering into the conduit into a biphasic mixture of liquid cryogen and vaporized liquid cryogen;

when the vessel is partially filled with a liquid cryogen, an exterior surface of the conduit is in direct contact with the liquid cryogen; and the conduit is adapted and configured to transfer heat to the biphasic mixture from the liquid cryogen in the liquid cryogen space and vaporize at least some of the liquid cryogen in the biphasic mixture, wherein the vessel is storing a cryogen in liquid form; and allowing the liquid cryogen in the liquid cryogen space to enter the conduit and have a pressure thereof be reduced by the pressure reducer, thereby producing a cooled biphasic mixture of the cryogen in liquid and vaporized forms, wherein the cooled biphasic mixture has a temperature lower than that of the liquid cryogen in the liquid cryogen space, wherein the vessel is a liquid cryogen storage tank located at an end-user facility and said method further comprises the steps of at least partially filling the vessel with the liquid cryogen from a tanker trailer of a liquid cryogen transport vehicle and using the liquid cryogen stored in the vessel at the end-user facility, said step of allowing being performed after said step of at least partially filling and before said step of using.

34. A method of subcooling a liquid cryogen, the method comprising the steps of:

providing an apparatus comprising:

a closed insulated cryogenic storage vessel adapted and configured to store cryogenic liquids, the vessel comprising a liquid cryogen outlet disposed in a wall thereof and a vaporized liquid cryogen outlet disposed in a wall thereof, wherein when the vessel is partially filled with a liquid cryogen, an interior of the vessel is divided into a liquid cryogen space and an ullage above the liquid cryogen space; and a hollow metal conduit at least partly disposed within the vessel that has an open first end disposed within the liquid cryogen space and a second end that is connected to or extends through the vaporized liquid cryogen outlet, wherein, a pressure reducer is disposed either within the conduit or at the first end that is adapted and configured to flash the liquid cryogen entering into the conduit into a biphasic mixture of liquid cryogen and vaporized liquid cryogen;

when the vessel is partially filled with a liquid cryogen, an exterior surface of the conduit is in direct contact with the liquid cryogen; and the conduit is adapted and configured to transfer heat to the biphasic mixture from the liquid cryogen in the liquid cryogen space and vaporize at least some of the liquid cryogen in the biphasic mixture, wherein the vessel is storing a cryogen in liquid form; and allowing the liquid cryogen in the liquid cryogen space to enter the conduit and have a pressure thereof be reduced by the pressure reducer, thereby producing a cooled biphasic mixture of the cryogen in liquid and vaporized forms, wherein the cooled biphasic mixture has a temperature lower than that of the liquid cryogen in the liquid cryogen space, wherein the pressure reducer is an controlled flow rate control valve or pressure control valve and said method further comprises the steps of:

feeding the liquid cryogen from the liquid cryogen outlet to a pump;

pumping the fed liquid cryogen to an end-use; and controlling the pressure reducer and the pump using one or more programmable logic controllers or distributed control systems that is coded with PID control logic, wherein said control of the pressure reducer is performed independent of said control of the pump.

35. The method of claim 23, further comprising the step of pumping the fed liquid cryogen from the liquid cryogen outlet to an end-use, wherein said steps of allowing and pumping at least partially overlap in time.

\* \* \* \* \*